United States Patent
Rugeland et al.

(10) Patent No.: US 11,395,207 B2
(45) Date of Patent: Jul. 19, 2022

(54) RADIO NETWORK NODE, A WIRELESS DEVICE AND METHODS THEREIN FOR RE-ESTABLISHING A RADIO CONNECTION

(71) Applicant: TELEFONAKTIEBOLAGET LM ERICSSON (PUBL), Stockholm (SE)

(72) Inventors: Patrik Rugeland, Stockholm (SE); Gunnar Mildh, Sollentuna (SE); Icaro L. J. Da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/270,174

(22) PCT Filed: Sep. 19, 2019

(86) PCT No.: PCT/SE2019/050888
§ 371 (c)(1),
(2) Date: Feb. 22, 2021

(87) PCT Pub. No.: WO2020/067965
PCT Pub. Date: Apr. 2, 2020

(65) Prior Publication Data
US 2022/0007255 A1    Jan. 6, 2022

(51) Int. Cl.
*H04W 36/00* (2009.01)
*H04W 76/19* (2018.01)
*H04W 36/30* (2009.01)

(52) U.S. Cl.
CPC ..... *H04W 36/305* (2018.08); *H04W 36/0022* (2013.01); *H04W 36/0079* (2018.08); *H04W 36/00837* (2018.08)

(58) Field of Classification Search
CPC ........... H04W 36/305; H04W 36/0022; H04W 36/0079; H04W 36/00837; H04W 76/19; H04W 88/02; H04W 88/08
See application file for complete search history.

(56) References Cited

U.S. PATENT DOCUMENTS

| | | | |
|---|---|---|---|
| 9,860,800 B2 * | 1/2018 | Van Lieshout | ... H04W 36/0055 |
| 10,028,200 B2 * | 7/2018 | Pelletier | ............ H04W 72/0453 |

(Continued)

FOREIGN PATENT DOCUMENTS

| | | |
|---|---|---|
| WO | 2018029621 A1 | 2/2018 |
| WO | 2020067959 A1 | 4/2020 |
| WO | 2020067961 A1 | 4/2020 |

OTHER PUBLICATIONS

"3rd Generation Partnership Project; Technical Specification Group Radio Access Network; Evolved Universal Terrestrial Radio Access (E-UTRA);" Radio Resource Control (RRC); Protocol specification Release 15, 3GPP TS 36.331 V15.2.0, Jun. 2018, pp. 1-791.

(Continued)

*Primary Examiner* — Ahmed Elallam
(74) *Attorney, Agent, or Firm* — Patent Portfolio Builders PLLC

(57) ABSTRACT

A wireless device and method for re-establishing a radio connection in a communications network comprising a first RAT and a different second RAT. The wireless device is operating in a first cell served by a first radio network node operating in the first RAT. When a connection failure with the first cell is detected, the wireless device performs a cell selection and selects a second cell served by a second radio network node operating in the second RAT. The second cell is known by the wireless device to be a candidate for re-establishment. The wireless device determines a first set of parameters to be used as an identifier of the wireless device, wherein the first set of parameters is associated with the first cell. The wireless device transmits, to the second cell, a re-establishment request message comprising the first set of parameters.

16 Claims, 13 Drawing Sheets

Method performed by wireless device 120,122

(56) References Cited

U.S. PATENT DOCUMENTS

| | | | | |
|---|---|---|---|---|
| 10,123,239 | B2* | 11/2018 | Yilmaz | H04W 76/16 |
| 10,841,302 | B2* | 11/2020 | Hahn | H04L 63/0869 |
| 2013/0260745 | A1 | 10/2013 | Johansson et al. | |
| 2018/0092085 | A1* | 3/2018 | Shaheen | H04W 76/16 |
| 2018/0132293 | A1 | 5/2018 | Escott et al. | |
| 2021/0176692 | A1* | 6/2021 | Rugeland | H04W 36/0072 |
| 2021/0211945 | A1* | 7/2021 | Rugeland | H04W 76/27 |
| 2021/0329723 | A1* | 10/2021 | Teyeb | H04W 12/037 |

OTHER PUBLICATIONS

"3rd Generation Partnership Project; Technical Specification Group Radio Access Network; Evolved Universal Terrestrial Radio Access (E-UTRA); Radio Resource Control (RRC);" Protocol specification (Release 15), 3GPP TS 36.331 V15.2.2, Jun. 2018, pp. 1-791.

"3rd Generation Partnership Project; Technical Specification Group Radio Access Network; Evolved Universal Terrestrial Radio Access (E-UTRA) and Evolved Universal Terrestrial Radio Access Network (E-UTRAN);" Overall description; Stage 2, (Release 15), 3GPP TS 36.300 V15.2.0, Jun. 2018, pp. 1-357.

"3rd Generation Partnership Project; Technical Specification Group Radio Access Network; Evolved Universal Terrestrial Radio Access (E-UTRA);" Physical channels and modulation, (Release 14), 3GPP TS 36.211 V14.7.0, Jun. 2018, pp. 1-197.

"3rd Generation Partnership Project; Technical Specification Group Radio Access Network; NR; NR and NG-RAN Overall Description;" Stage 2, (Release 15), 3GPP TS 38.300 V15.2.0, Jun. 2018, pp. 1-87.

"3rd Generation Partnership Project; Technical Specification Group Radio Access Network;" NG-RAN; Xn application protocol (XnAP) (Release 15), 3GPP TS 38.423 V15.0.0, Jun. 2018, pp. 1-195.

"3rd Generation Partnership Project; Technical Specification Group Radio Access Network;" NR; Radio Resource Control (RRC) protocol specification, Release 15, 3GPP TS 38.331 V15.2.1, Jun. 2018, pp. 1-303.

"3rd Generation Partnership Project; Technical Specification Group Services and System Aspects; 3GPP System Architecture Evolution (SAE)," Security architecture (Release 15), 3GPP Standard ; Technical Specification ; 3GPP TS 33.401 V15.1.0, Sep. 21, 2017, pp. 1-161.

"3rd Generation Partnership Project; Technical Specification Group Services and System Aspects; 3GPP System Architecture Evolution (SAE)," Security architecture (Release 15), 3GPP Standard ; Technical Specification ; 3GPP TS 33.401 V15.4.0, Jun. 2018, pp. 1-162.

"3rd Generation Partnership Project; Technical Specification Group Services and System Aspects;" Security architecture and procedures for 5G system, Release 15, 3GPP TS 33.501-15.1.0, Jun. 2018, pp. 1-152.

3GPP TSG-RAN WG2 #103, Tdoc R2-1812449, Gothenburg, Sweden, Aug. 20-24, 2018, pp. 1-3.

3GPP TSG-WG2 Meeting #102AH R2-1810388, Montreal, Canada, Jul. 2-6, 2018, pp. 1-388.

3GPP TSG-WG2 Meeting #103, R2-1813492, Gothenburg, Sweden, Aug. 20-24, 2018, pp. 1-472.

International Preliminary Report on Patentability dated Dec. 17, 2020 in related/corresponding PCT Application No. PCTSE2019050875.

International Preliminary Report on Patentability dated Dec. 18, 2020 in related/corresponding PCT Application No. PCT/SE2019/050888.

International Preliminary Report on Patentability dated Dec. 21, 2020 in related/corresponding PCT Application No. PCT/SE2019/050878.

International Search Report / Written Opinion dated Dec. 10, 2019 in related/corresponding PCT Application No. PCT/SE2019/050888.

International Search Report / Written Opinion dated Nov. 18, 2019 in related/corresponding PCT Application No. PCT/SE2019/050875.

International Search Report / Written Opinion dated Nov. 19, 2019 in related/corresponding PCT Application No. PCT/SE2019/050878.

* cited by examiner

Fig. 3 Method performed by wireless device 120,122

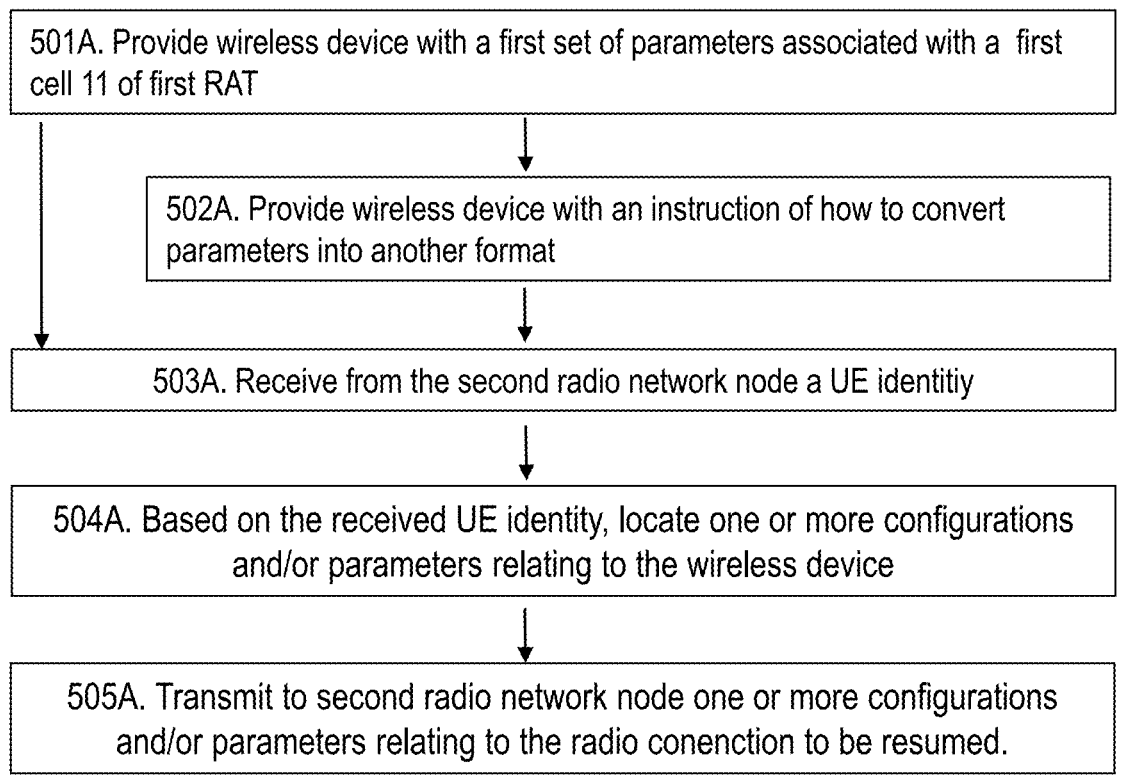
Fig. 5A Method performed by first radio network node 110

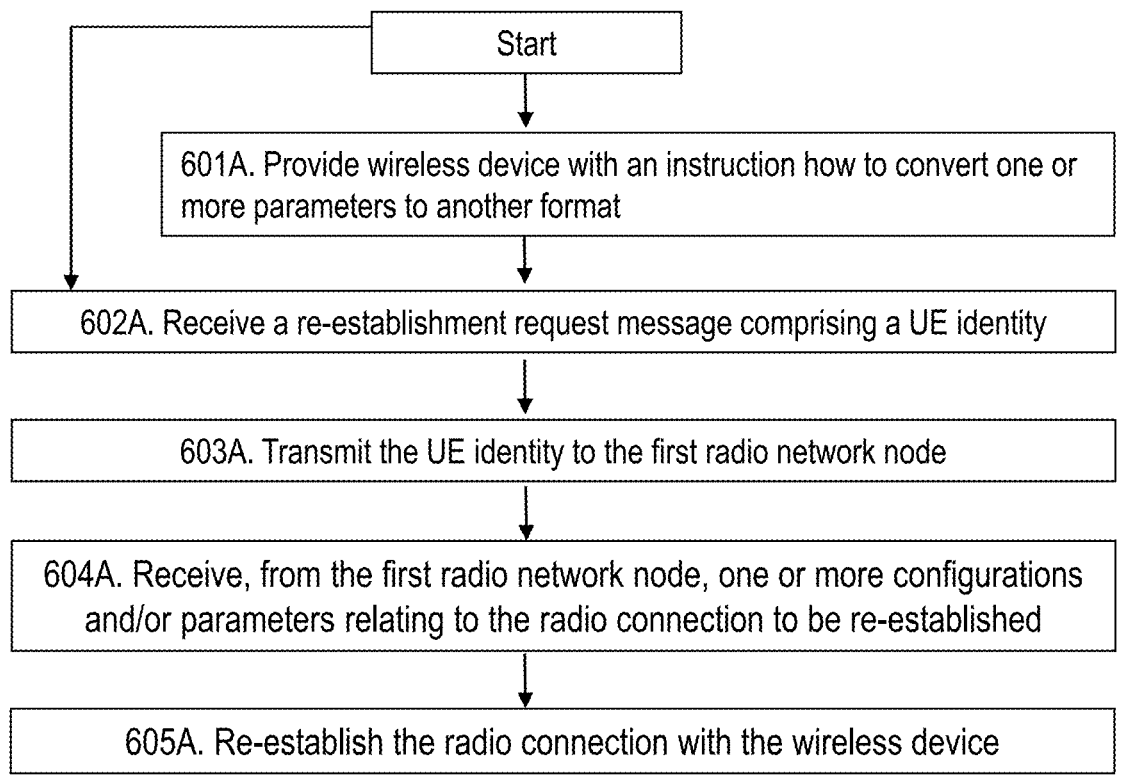
Fig. 6A Method performed by second radio network node 112

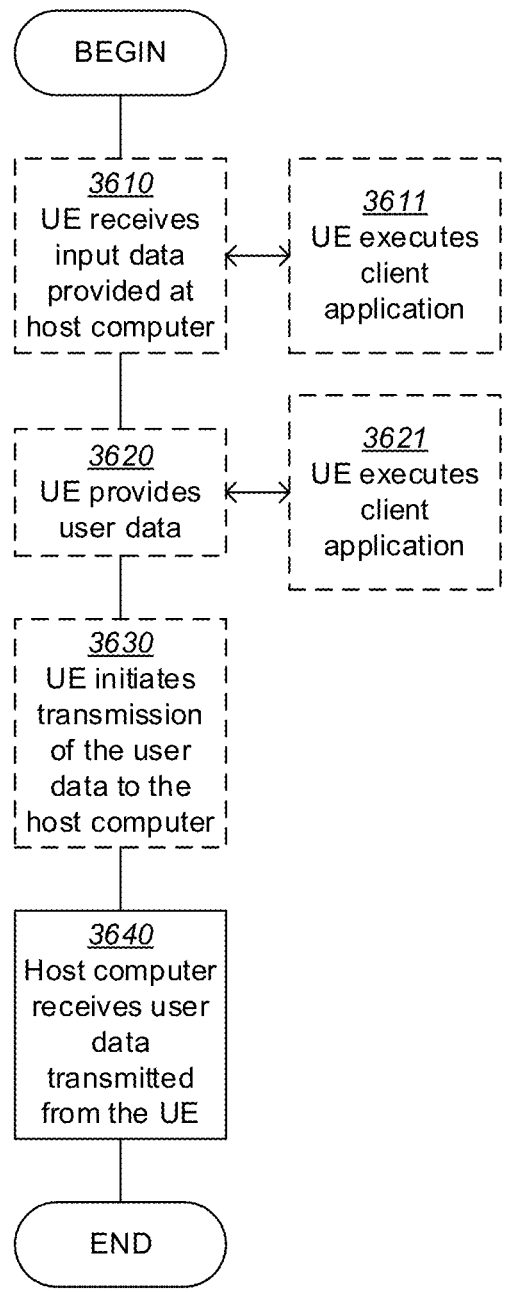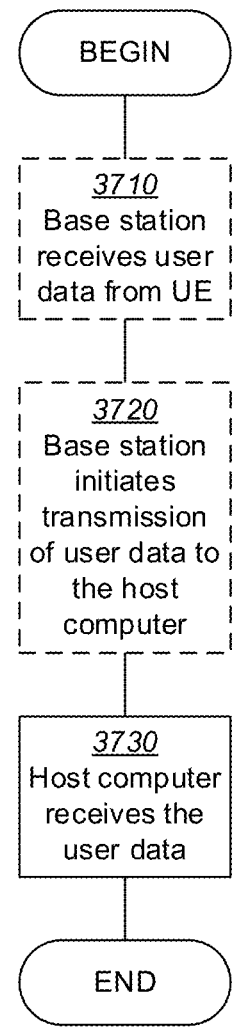
Fig. 13
Fig. 14

RADIO NETWORK NODE, A WIRELESS DEVICE AND METHODS THEREIN FOR RE-ESTABLISHING A RADIO CONNECTION

BACKGROUND

In a typical wireless communication network, wireless devices, also known as wireless communication devices, mobile stations, stations (STAs) and/or User Equipments (UEs), communicate via a Local Area Network (LAN) such as a WiFi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

1.1 LTE and NR/EPS and 5GS

There are different ways to deploy the 5G network with or without interworking with LTE (also referred to as E-UTRA) and Evolved Packet Core (EPC), as depicted in FIG. 1. In principle, the NR and the LTE may be deployed without any interworking, denoted by NR Stand-Alone (SA) operation: In other words a gNB in NR may be connected to a 5G core network (5GC) and an eNB may be connected to the EPC with no interconnection between the two. This relates to Option 1 and Option 2 in FIG. 1. On the other hand, the first supported version of NR is the so-called E-UTRAN-NR Dual Connectivity EN-DC), illustrated by Option 3 in FIG. 1. In such a deployment, a dual connectivity between the NR and the LTE is applied with the eNB of the LTE as the master node and the gNb of the NR as the secondary node. The RAN node; e.g. the gNB, supporting NR, may not have a control plane connection to the core network, i.e. to the EPC, instead it relies on the eNB of the LTE as master node MeNB. This is also called as "Non-standalone NR". Note that in this case the functionality of an NR cell is limited and would be used for connected mode UEs as a booster and/or diversity leg, but an RRC_IDLE UE, i.e. a UE in an RRC_IDLE state, cannot camp on these NR cells.

With introduction of the 5GC, other options may also be valid. As mentioned above, option 2 supports stand-alone NR deployment wherein the gNB is connected to the 5GC. Similarly, the LTE may also be connected to the 5GC using option 5 in FIG. 1. This is also known as eLTE, E-UTRA/5GC, or LTE/5GC. In these cases, both the NR and the LTE are seen as part of the NG-RAN. It is worth noting that, Option 4 and option 7 in FIG. 1 are other variants of dual connectivity between the LTE and the NR which will be standardized as part of the NG-RAN connected to the 5GC, denoted by Multi-Radio Dual Connectivity (MR-DC). The Options 6 and 8 in FIG. 1, where the gNB is connected to the EPC, with and without interconnectivity to LTE, are also possible, although they seem to be less practical and hence they will not be pursued further in the 3GPP.

As migration for these options may differ from different operators, it is possible to have deployments with multiple options in parallel in the same network e.g. there may be eNB base station supporting options 3, 5 and 7 in the same network as NR base station supporting options 2 and 4. In combination with dual connectivity solutions between the LTE and the NR it is also possible to support Carrier Aggregation (CA) in each cell group, i.e. in Master Cell Group (MCG) and Slave Cell Group (SCG) and dual connectivity between the nodes on same RAT, e.g. NR-NR DC. For the LTE cells, a consequence of these different deployments is the co-existence of the LTE cells associated to the eNBs connected to the EPC, the 5GC or to both the EPC and the 5GC.

1.2 RRC Reestablishment

In the NR or the LTE, if a UE in a RRC_CONNECTED state detects a Radio Link Failure (RLF) on the MCG or declares a handover failure, e.g. a reconfiguration with sync in NR, triggered upon the expiry of the timer T304, the UE selects a 'suitable cell' and initiates an RRC reestablishment. The definition of a suitable cell is identical in TS 36.300 and in TS 38.300:

A suitable cell is one for which the measured cell attributes satisfy the cell selection criteria; the cell PLMN is the selected PLMN, registered or an equivalent PLMN; the cell is not barred or reserved and the cell is not part of a tracking area which is in the list of "forbidden tracking areas for roaming";

If the UE selects a cell belonging to the same RAT and system as it was connected to prior to the failure (NR to NR, LTE/EPC to LTE/EPC, or LTE/5GC to LTE/5GC), the UE stops a timer T311 (if this was triggered by RLF) and initiates the re-establishment procedure by starting a timer T301 and transmitting the re-establishment request. However, if the UE selects an inter-RAT cell (e.g. NR to LTE/EPC or LTE/5GC as well as LTE/EPC or LTE/5GC to NR) the UE will transition to an IDLE state and perform NAS signaling. It should be noted that NAS signaling is less optimized than re-establishment. So, if the UE is in the RRC_CONNECTED state in the NR it will enter the RRC_IDLE state and upper layers may trigger a new connection. The same is also true if the UE selects an inter-system cell, i.e. the UE was connected to an LTE/EPC cell and reselects to an LTE/5GC cell, or the UE is connected to an LTE/5GC cell and reselects to an LTE/EPC cell.

The procedures to trigger the re-establishment are specified in TS 36.331 (clause 5.3.7.3) for LTE and in TS 38.331 (clause 5.3.7.3) for NR. The procedures to prepare the RRCConnectionReestablishmentRequest and the RRCReestablishmentRequest message are specified in TS 36.331 and TS 38.331 (in section 5.3.7.4) for LTE and NR, respectively. In both the LTE RRCConnectionReestablishmentRequest and the NR RRCReestablishmentRequest message, the UE includes a ue-Identity which enables the network to identify the UE AS Context and properly continue the re-establishment procedure by sending an RRCConnectionReestablishment or RRCReestablishment message, containing the Next Hop Chaining Count (NCC) for security key refresh and an RRCConnectionReconfiguration or RRCReconfiguration message (to resume the DRBs). For NR, at least, the RRCReconfiguration message may be multiplexed with the RRCReestablishment thanks to the fact that it is sent on SRB1 (i.e. integrity protected). The following subsections show how the procedures and messages are defined in TS 36.331 for LTE and in TS 38.331 for NR.

1.2.1. RRC Reestablishment Request in LTE
1.2.2. Reestablishment Request Procedures in LTE TS 36.331 section 5.3.7.3 Actions following cell selection while T311 is running Upon selecting a suitable E-UTRA cell, the UE shall:
    1> if the UE is connected to 5GC and the selected cell only connected to EPC; or
    1> if the UE is connected to EPC and the selected cell only connected to 5GC:
        2> perform the actions upon leaving RRC_CONNECTED as specified in 5.3.12, with release cause 'RRC connection failure';
    1> else:
        2> stop timer T311;
        2> start timer T301;
        2> apply the timeAlignmentTimerCommon included in SystemInformationBlockType2;
        2> if the UE is a NB-IoT UE supporting RRC connection re-establishment for the Control Plane CIoT EPS optimisation and AS security has not been activated; and
        2> if cp-reestablishment is not included in SystemInformationBlockType2-NB:
            3> perform the actions upon leaving RRC_CONNECTED as specified in 5.3.12, with release cause 'RRC connection failure';
        2> else:
            3> initiate transmission of the RRCConnectionReestablishmentRequest message in accordance with 5.3.7.4;

NOTE: This procedure applies also if the UE returns to the source PCell.

Upon selecting an inter-RAT cell, the UE shall:
    1> if the selected cell is a UTRA cell, and if the UE supports Radio Link Failure Report for Inter-RAT MRO, include selectedUTRA-CellId in the VarRLF-Report and set it to the physical cell identity and carrier frequency of the selected UTRA cell;
    1> perform the actions upon leaving RRC_CONNECTED as specified in 5.3.12, with release cause 'RRC connection failure';

5.3.7.4 Actions related to transmission of RRCConnectionReestablishmentRequest message Except for NB-IoT, if the procedure was initiated due to radio link failure or handover failure, the UE shall:
    1> set the reestablishmentCellId in the VarRLF-Report to the global cell identity of the selected cell;

The UE shall set the contents of RRCConnectionReestablishmentRequest message as follows:
    1> except for a NB-IoT UE for which AS security has not been activated, set the ue-Identity as follows:
        2> set the c-RNTI to the C-RNTI used in the source PCell (handover and mobility from E-UTRA failure) or used in the PCell in which the trigger for the re-establishment occurred (other cases);
        2> set the physCellId to the physical cell identity of the source PCell (handover and mobility from E-UTRA failure) or of the PCell in which the trigger for the re-establishment occurred (other cases);
        2> set the shortMAC-I to the 16 least significant bits of the MAC-I calculated:
            3> over the ASN.1 encoded as per section 8 (i.e., a multiple of 8 bits) VarShortMAC-Input (or VarShortMAC-Input-NB in NB-IoT);
            3> with the $K_{RRCint}$ key and integrity protection algorithm that was used in the source PCell (handover and mobility from E-UTRA failure) or of the PCell in which the trigger for the re-establishment occurred (other cases); and
            3> with all input bits for COUNT, BEARER and DIRECTION set to binary ones;
    1> for a NB-IoT UE for which AS security has not been activated, set the ue-Identity as follows:
        2> request upper layers for calculated ul-NAS-MAC and ul-NAS-Count using the cellIdenfity of the PCell in which the trigger for the re-establishment occurred;
        2> set the s-TMSI to the S-TMSI provided by upper layers;
        2> set the ul-NAS-MAC to the ul-NAS-MAC value provided by upper layers;
        2> set the ul-NAS-Count to the ul-NAS-Count value provided by upper layers;
    1> set the reestablishmentCause as follows:
        2> if the re-establishment procedure was initiated due to reconfiguration failure as specified in 5.3.5.5 (the UE is unable to comply with the reconfiguration):
            3> set the reestablishmentCause to the value reconfigurationFailure;

2> else if the re-establishment procedure was initiated due to handover failure as specified in 5.3.5.6 (intra-LTE handover failure) or 5.4.3.5 (inter-RAT mobility from EUTRA failure):
    3> set the reestablishmentCause to the value handoverFailure;
2> else:
    3> set the reestablishmentCause to the value otherFailure;
1> if the UE is a NB-IoT UE:
    2> if the UE supports DL channel quality reporting and cqi-Reporting is present in SystemInformation-BlockType2-NB:
        3> set the cqi-NPDCCH to include the latest results of the downlink channel quality measurements of the serving cell as specified in TS 36.133 [16];
NOTE: The downlink channel quality measurements may use measurement period T1 or T2, as defined in TS 36.133. In case period T2 is used the RRC-MAC interactions are left to UE implementation.
    2> set earlyContentionResolution to TRUE;
The UE shall submit the RRCConnectionReestablishmentRequest message to lower layers for transmission.

1.2.2.1 Reestablishment Request Message in LTE

RRCConnectionReestablishmentRequest Message

```
-- ASN1START
RRCConnectionReestablishmentRequest ::= SEQUENCE {
    criticalExtensions              CHOICE {
        rrcConnectionReestablishmentRequest-r8
                                    RRCConnectionReestablishmentRequest-r8-IEs,
        criticalExtensionsFuture    SEQUENCE { }
    }
}
RRCConnectionReestablishmentRequest-r8-IEs ::= SEQUENCE {
    ue-Identity             ReestabUE-Identity,
    reestablishmentCause    ReestablishmentCause,
    spare                   BIT STRING (SIZE (2))
}
ReestabUE-Identity ::=      SEQUENCE {
    c-RNTI                      C-RNTI,
    physCellId                  PhysCellId,
    shortMAC-I                  ShortMAC-I
}
ReestablishmentCause ::=    ENUMERATED {
                                reconfigurationFailure, handoverFailure,
                                otherFailure, spare1}
-- ASN1STOP
```

RRCConnectionReestablishmentRequest field descriptions physCellId
The Physical Cell Identity of the PCell the UE was connected to prior to the failure.
reestablishmentCause
Indicates the failure cause that triggered the re-establishment procedure. eNB is not expected to reject a RRCConnectionReestablishmentRequest due to unknown cause value being used by the UE.
ue-Identity
UE identity included to retrieve UE context and to facilitate contention resolution by lower layers.

1.2.2.2. UE Identifiers during Reestablishment in LTE

In E-UTRA, the fields to be set (c-RNTI and physCellId) in the RRCConnectionReestablishment message have the following format:

C-RNTI

The IE C-RNTI identifies a UE having a RRC connection within a cell.

C-RNTI Information Element

```
-- ASN1START
C-RNTI ::=          BIT STRING (SIZE (16))
-- ASN1STOP
```

PhysCellId
The IE PhysCellId is used to indicate the physical layer identity of the cell, as defined in TS 36.211 [21].

PhysCellId Information Element

```
-- ASN1START
PhysCellId ::=      INTEGER (0..503)
-- ASN1STOP
```

1.2.3 RRC Reestablishment Request in NR
1.2.3.1. Reestablishment Request Procedures in NR
TS 38.331 section 5.3.7.3 Actions following cell selection while T311 is running Upon selecting a suitable NR cell, the UE shall:
    1> stop timer T311;
    1> start timer T301;
    1> initiate transmission of the RRCReestablishmentRequest message in accordance with 5.3.7.4
NOTE: This procedure applies also if the UE returns to the source PCell.
Upon selecting an inter-RAT cell, the UE shall:
    1> perform the actions upon going to RRC_IDLE as specified in 5.3.11, with release cause 'RRC connection failure';

TS 38.331 section 5.3.7.4 Actions related to transmission of RRCReestablishmentRequest message The UE shall set the contents of RRCReestablishmentRequest message as follows:

1> set the ue-Identify as follows:
    2> set the c-RNTI to the C-RNTI used in the source PCell (reconfiguration with sync or mobility from NR failure) or used in the PCell in which the trigger for the re-establishment occurred (other cases);
    2> set the physCellId to the physical cell identity of the source PCell (reconfiguration with sync or mobility from NR failure) or of the PCell in which the trigger for the re-establishment occurred (other cases);
    2> set the shortMAC-I to the 16 least significant bits of the MAC-I calculated:
      3> over the ASN.1 encoded as per section 8 (i.e., a multiple of 8 bits) VarShortMAC-Input;
      3> with the $K_{RRCint}$ key and integrity protection algorithm that was used in the source PCell (reconfiguration with sync or mobility from NR failure) or of the PCell in which the trigger for the re-establishment occurred (other cases); and
      3> with all input bits for COUNT, BEARER and DIRECTION set to binary ones;
    2> if the re-establishment procedure was initiated due to reconfiguration failure as specified in 5.3.5.8:
      3> set the reestablishmentCause to the value reconfigurationFailure;
    2> else if the re-establishment procedure was initiated due to reconfiguration with sync failure as specified in 5.3.5.8.3 (intra-NR handover failure) or 5.4.3.5 (inter-RAT mobility from NR failure):
      3> set the reestablishmentCause to the value handoverFailure;
    2> else:
      3> set the reestablishmentCause to the value otherFailure;
  1> restore the RRC configuration and security context from the stored UE AS context;
  1> restore the PDCP state and re-establish PDCP for SRB1;
  1> re-establish RLC for SRB1;
  1> resume SRB1;
  1> The UE shall submit the RRCReestablishmentRequest message to lower layers for transmission.

1.2.3.2. Reestablishment Request Message in NR

RRCReestablishmentRequest Message

```
-- ASN1START
-- TAG-RRCREESTABLISHMENTREQUEST-START
RRCReestablishmentRequest ::=    SEQUENCE {
    rrcReestablishmentRequest    RRCReestablishmentRequest-IEs
}
RRCReestablishmentRequest-IEs ::= SEQUENCE {
    ue-Identity              ReestabUE-Identity,
    reestablishmentCause     ReestablishmentCause,
    spare                    BIT STRING (SIZE (1))
}
ReestabUE-Identity ::=       SEQUENCE {
    c-RNTI                   RNTI-Value,
    physCellId               PhysCellId,
    shortMAC-I               ShortMAC-I
}
ReestablishmentCause ::=     ENUMERATED {
                             reconfigurationFailure,
handoverFailure, otherFailure, spare1}
-- TAG-RRCREESTABLISHMENTREQUEST-STOP
-- ASN1STOP
```

| RRCReestablishmentRequest field descriptions |
| --- |
| 1 physCellId |
| 2 The Physical Cell Identity of the PCell the UE was connected to prior to the failure. |
| 3 reestablishmentCause |
| 4 Indicates the failure cause that triggered the re-establishment procedure. gNB is not expected to reject a RRCReestablishmentRequest due to unknown cause value being used by the UE. |
| 5 ue-Identity |
| 6 UE identity included to retrieve UE context and to facilitate contention resolution by lower layers. |

1.2.3.3. UE Identifiers During Reestablishment in NR

In NR, the fields to be set (i.e. c-RNTI and physCellId) in the RRCReestablishmentRequest message have the following format:

RNTI-Value

The RNTI-ValueIE represents a Radio Network Temporary Identity.

RNTI-Value Information Element

```
-- ASN1START
-- TAG-RNTI-VALUE-START
RNTI-Value ::=              INTEGER (0..65535)
-- TAG-RNTI-VALUE-STOP
-- ASN1STOP
```

PhysCellId

The PhysCellId identifies the physical cell identity (PCI).

PhysCellId Information Element

```
-- ASN1START
-- TAG-PHYS-CELL-ID-START
PhysCellId ::=              INTEGER (0..1007)
-- TAG-PHYS-CELL-ID-STOP
-- ASN1STOP
```

SUMMARY

Out of the interworking options discussed above and illustrated in FIG. 1, embodiments disclosed herein relate to options 2 and 5 i.e. a UE in NR standalone triggers re-establishment initiation and selects an LTE cell, or a UE in eLTE standalone triggers re-establishment initiation and selects an NR cell. However, it should be understood that embodiments disclosed herein are equally applicable in options 3, 4, and 7 when the UE triggers re-establishment initiation in the master node, regardless of whether there is a secondary node configured.

In the prior art it is not clear how to identify a UE during an inter-RAT re-establishment procedure or any other re-establishment procedure wherein the source network node and the target node have different formatting for the UE identifier.

An object of embodiments disclosed herein is therefore to overcome or at least ameliorate the drawbacks with the prior art.

According to an aspect of embodiments herein, the object is achieved by a method performed by a wireless device for re-establishing a radio connection in a wireless communications network comprising a first Radio Access Technology (RAT) and a second RAT being different from the first RAT. The wireless device is operating in a first cell served by a first radio network node operating in the first RAT.

When a connection failure with the first cell served by the first radio network node is detected, the wireless device performs a cell selection and selects a second cell served by a second radio network node operating in the second RAT. The second cell is known by the wireless device to be a candidate for re-establishment.

Further, the wireless device determines a first set of parameters to be used as an identifier of the wireless device, wherein the first set of parameters is associated with the first cell.

Furthermore, the wireless device transmits, to the second cell, a re-establishment request message comprising the first set of parameters as the identifier of the wireless device.

According to another aspect of embodiments herein, the object is achieved by a wireless device for re-establishing a radio connection in a wireless communications network comprising a first Radio Access Technology (RAT) and a second RAT being different from the first RAT. The wireless device is configured to operate in a first cell served by a first radio network node configured to operate in the first RAT.

The wireless device is configured to perform a cell selection and to select a second cell served by a second radio network node operating in the second RAT, when a connection failure with the first cell served by the first radio network node is detected. The second cell is known by the wireless device to be a candidate for re-establishment.

Further, the wireless device is configured to determine a first set of parameters to be used as an identifier of the wireless device, wherein the first set of parameters is associated with the first cell.

Furthermore, the wireless device is configured to transmit, to the second cell, a re-establishment request message comprising the first set of parameters as the identifier of the wireless device.

According to another aspect of embodiments herein, the object is achieved by a method performed by a second radio network node for assisting a wireless device in re-establishing a radio connection in a wireless communications network comprising a first Radio Access Technology (RAT) and a second RAT being different from the first RAT. The second radio network node operates in the second RAT, and the wireless device is operating in a first cell served by a first radio network node operating in the first RAT. The second radio network node receives a re-establishment request message comprising an identifier of the wireless device transmitting the re-establishment request message when a failure of a radio connection with the first radio network node is detected.

Further, the second radio network node determines the first radio network node based on the identifier, and transmits the identifier to the first radio network node.

Furthermore, the second radio network node receives, from the first radio network node, one or more configurations and/or parameters relating to the radio connection to be re-established, and re-establishes the connection with the wireless device based on the one or more configurations and/or parameters.

According to another aspect of embodiments herein, the object is achieved by a second radio network node for assisting a wireless device in re-establishing a radio connection in a wireless communications network comprising a first Radio Access Technology (RAT) and a second RAT being different from the first RAT. The second radio network node is configured to operate in the second RAT, and the wireless device is configured to operate in a first cell served by a first radio network node configured to operate in the first RAT.

The second radio network node is configured to receive a re-establishment request message comprising an identifier of the wireless device transmitting the re-establishment request message when a failure of a radio connection with the first radio network node is detected.

Further, the second radio network node is configured to determine the first radio network node based on the identifier, and to transmit the identifier to the first radio network node.

Furthermore, the second radio network node is configured to receive, from the first radio network node, one or more configurations and/or parameters relating to the radio connection to be re-established, and re-establishes the connection with the wireless device based on the one or more configurations and/or parameters.

According to another aspect of embodiments herein, the object is achieved by a computer program comprising instructions, which when executed by at least one processor of the wireless device, cause the at least one processor of the wireless device to perform one or more of the actions described herein.

According to another aspect of embodiments herein, the object is achieved by a computer program comprising instructions, which when executed by at least one processor of the first radio network node, cause the at least one processor of the second radio network node to perform one or more of the actions described herein.

According to another aspect of embodiments herein, the object is achieved by a carrier comprising the respective computer program, wherein the carrier is one of an electronic signal, an optical signal, an electromagnetic signal, a magnetic signal, an electric signal, a radio signal, a microwave signal, or a computer-readable storage medium.

Since the wireless device, when a connection failure with the first cell served by the first radio network node is detected, determines a first set of parameters to be used as an identifier of the wireless device, and transmits, to the second cell, a re-establishment request message comprising the first set of parameters, the second radio network node serving the second cell is able to identify the first radio network node based on the first set of parameters and may request the first radio network node about the configurations and/or parameters to be used when re-establishing the connection with the wireless device. Thereby the signaling needed to reestablish the connection after link failure is reduced as is the time needed for resuming the connection. This results in an improved performance of the wireless communications network.

An advantage of some embodiments disclosed herein is that they enable a faster reestablishment of a connection in a second RAT after a connection failure in a first RAT, since the wireless device does not have to enter an RRC_IDLE state.

BRIEF DESCRIPTION OF THE DRAWINGS

Examples of embodiments herein are described in more detail with reference to attached drawings in which:

FIG. 5A is a flowchart depicting embodiments of methods in a first radio network node;

FIG. 6A is a flowchart depicting embodiments of methods in a second radio network node;

FIGS. 11-14 are flowcharts illustrating methods implemented in a communication system including a host computer, a base station and a user equipment.

DETAILED DESCRIPTION

Figure 1:
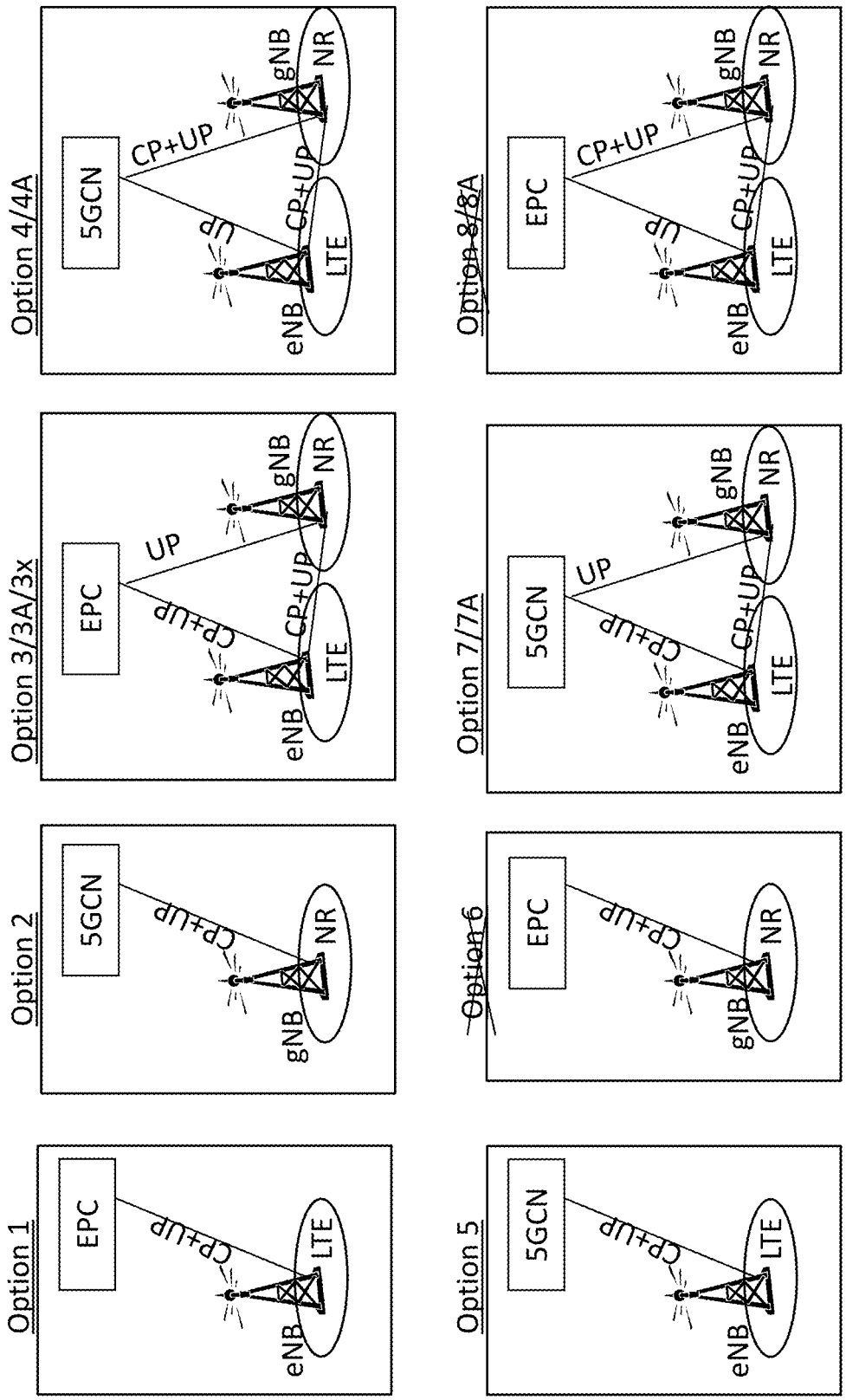
FIG. 1 shows different deployment options of a 5G network according to prior art.

As a part of developing embodiments herein a problem will first be identified and discussed.

The problem relates to supporting inter-RAT re-establishment between LTE and NR. Section 2.2 discusses the benefits of inter-RAT re-establishment. Section 2.3 describes the problem with trying to reuse the current solution for the intra-RAT re-establishment within LTE and within NR also for inter-RAT re-establishment.

2.2 Inter-RAT Re-Establishment Between NR and LTE

In both LTE and NR, when the UE detects a radio link failure or fails a handover (among other reasons), it needs to select a suitable cell and, if that cell is in the same RAT, the UE initiates an RRC reestablishment procedure. However, if the cell the UE reselects to is an inter-RAT cell, the UE will release the AS context and go to an RRC_IDLE state, possibly triggering NAS recovery with a new connection establishment, e.g. a RRC Connection Establishment.

The performance of the RRC re-establishment procedure is much better than the performance of a procedure going via the IDLE state. The reason for this is that the number of messages needed to be exchanged over the radio interface between the UE and a target network is much lesser for the RRC Re-establishment than for the RRC Connection Establishment procedure used when going via the IDLE state which reduces both the round-trip times as well as the processing times of the messages.

For example, in the LTE connected to the EPC, when the UE performs the re-establishment procedure, the UE transmits a re-establishment request like message to the network. The network then verifies that this message is from a real UE. The verification may be done thanks to the security token short MAC-I included in the message and the information related to the UE context stored on the network side. If the message is verified, the network sends a re-establishment message (for the SRB1 setup) immediately followed by an RRC Reconfiguration message. When the UE receives these messages, it may resume the connection, e.g. start sending and/or receiving data traffic. During this process the CN signaling connection is maintained between the RAN and the CN for the UE.

The RRC connection establishment procedure, invoked when the UE goes via the RRC_IDLE state, on the other hand involves three 3 separate RRC signaling procedures, i.e. a setup procedure, a security mode command procedure and an RRC reconfiguration procedure, plus also CN-RAN signaling and NAS signaling to re-setup the CN signaling connection.

Despite these benefits in re-establishment, the inter-RAT re-establishment in LTE towards other RATs, e.g. like UTRA or GSM, was not supported, i.e. standardized. Most likely the reason for this, i.e. for not standardizing, is that the procedure would be quite complex and perhaps not feasible since other RATs, e.g. UTRAN and GSM, would always have different core networks. And, it would not be possible to identify the UE AS context and maintain CN connection.

In NR, for release 15, the inter-RAT re-establishment at least between NR and eLTE was considered and has quite some likelihood to be standardized in further NR releases. eLTE refers to the scenario when the LTE radio access network is connected to the 5GC. In NR and eLTE, the inter-RAT re-establishment is feasible thanks to the fact that the same CN is used for both the eLTE and the NR, i.e. both RATs are connect to the same core network. Also, many aspects are to certain extent harmonized across RATs such as security key handling and overall framework, higher layers protocols (like PDCP), etc. Such a solution also becomes attractive as it is likely that a UE connected to an NR cell may experience sudden drop in radio conditions which may lead to RLF and/or handover, e.g. reconfiguration with sync, failures since it is likely that the NR will be deployed in higher frequencies which due to radio propagation characteristics has spottier geographical coverage.

2.3 Current Solution and Problem to be Solved

An existing solution is the intra-RAT re-establishment procedure/messages in the NR and the eLTE, i.e. the LTE connected to the 5GC. When the UE attempts the RRC Reestablishment, it transmits an RRC Reestablishment Request message, which contains a UE identifier, e.g. a Physical cell Identity (PCI) and a Cell Radio Network Temporary identifier (C-RNTI). The UE identifier enables the network to locate the UE AS Context in case the selected cell is not prepared. By the expression "selected cell is not prepared" is meant that the target cell does not yet have the UE AS Context or information needed to re-establish the connection with the selected cell. The RRC Reestablishment Request message also contains a security token so the UE may be authenticated.

The problem solved by some embodiments disclosed herein is mainly in the context of inter-RAT connection reestablishment i.e. when the UE being connected in one RAT detects a failure, e.g. like an RLF or handover failure, and needs to reestablish in another RAT. In particular, it is not clear which UE identifier is going to be used when the selected target cell does not support the same type of re-establishment identifiers or when the selected target cell supports the same kind of identifiers but with a different format, e.g. number of bits in the re-establishment request message. It should be noted that the size of the re-establishment request is a problematic topic as the size relates to the coverage that a system may have in the uplink.

2.3.1 Problem 1: A UE Connected to NR Fails and Initiates Re-Establishment in LTE.

According to the definition in the procedure, the PCI is the one associated to the source PCell, which PCI in this case when the UE is connected to a NR cell is encoded with 10 bits (up to 1007 values). However, as the UE is re-establishing in LTE, the existing message in EUTRA specifications assumes an LTE cell with PCI up to 503 values (i.e. encoded in 9 bits). In other words, with the existing solution the existing re-establishment message in the E-UTRA would not fit the PCI of an NR cell. In addition, despite the fact that the C-RNTI has the same number of values, i.e. encoded with same number of bits in both NR and LTE, it is not certain that the provided C-RNTI is associated to an incoming LTE cell or NR cell, which makes it unfeasible to easily identify the UE AS Context to properly perform an inter-RAT re-establishment.

For an eLTE intra-RAT re-establishment, the procedure for sending an RRC Re-establishment Request should most likely be the same as in LTE, since the C-RNTI and the PCI are source cell properties that have not been changed from the LTE to the eLTE. It should be noted that in this disclosure, the term E-UTRA is sometimes used to refer to LTE or to eLTE.

2.3.2 Problem 2: A UE Connected to LTE Fails and Initiates Re-Establishment in NR.

According to the definition in the procedure, the source PCI is the one associated to the source PCell, which in this case is an LTE cell with PCI encoded with 9 bits. However, as the UE is re-establishing in NR, the existing solution relies on a message defined only for a source NR cell which has PCI up to 1007 values (i.e. encoded in 10 bits). In other words, with existing solution the existing re-establishment request message in NR would not fit exactly the PCI of the LTE cell to properly support an inter-RAT re-establishment. In addition, despite the fact that the C-RNTI has the same number of values, i.e. encoded with same number of bits, it is not certain that the provided C-RNTI is associated to an incoming NR cell or LTE cell, which makes it unfeasible to easily identify the UE AS Context to properly perform an inter-RAT re-establishment or at least the UE context identification in an unambiguous manner.

Some embodiments disclosed herein focus on the UE identification during an RRC Reestablishment in the case source RAT and target RAT have differences in their fields, such as in the case of inter-RAT reestablishment or any kind of radio link failure procedure or reestablishment procedure. The method is then used when the UE detects a failure in one RAT and initiates the re-establishment in another RAT.

Some embodiments disclosed herein provide multiple mechanisms at a UE and a network node for being able to indicate the UE identifier used in Reestablishment procedure in case of inter-RAT reestablishment procedures. More generally, in case both the source RAT wherein UE is connected and wherein the UE detects a failure and the target RAT wherein the UE tries to reestablish differs in the UE identifier. Some embodiments disclosed herein relates to a method performed by a UE that has detected a failure in one first source RAT and is performing a Reestablishment procedure in a second RAT, the method comprising:

Determining a set of parameters to be used as a UE identifier and to be included in a re-establishment request message to a second target RAT. The set of parameters is associated to a cell in a first source RAT wherein the UE is connected. Some examples of parameters are source physical cell identity in first RAT, source C-RNTI in first RAT, etc. The determination may be done upon detecting the failure e.g. radio link failure, handover failure, beam failure, reconfiguration with sync failure or any other failure or ordinary triggering leading to a re-establishment and initiating reestablishment;

Updating the set of parameters described in the previous step so that it may fit the format of the re-establishment request message defined in a second target RAT. How these are updated is explained later in this disclosure.

Setting the UE identifier in the re-establishment request message of the second target RAT to the value updated in the previous step;

Transmitting the re-establishment request message with the UE identifier set to the value described in the previous step;

Some embodiments disclosed herein describe different alternatives or versions of what is described above. Embodiments will be described in more detail with reference to some exemplifying embodiments.

Some first exemplifying embodiments. Convert source RAT parameters, e.g. the C-RNTI and the PCI, to target RAT message format by mapping, recalculating, truncating, or padding, and use variables defined in the target RAT.

Some second exemplifying embodiments. Create a new inter-RAT re-establishment request kind of message in each target RAT allowing source RAT parameters, e.g. the C-RNTI and the PCI, in the source RAT format to be transmitted in the second RAT during re-establishment without the need to perform further adjustments.

Some third exemplifying embodiments. Create one or more new inter-RAT Re-establishment fields and/or Information Elements (IEs) or extend the existing Re-establishment message in each RAT to allow both RAT formats for the UE identifiers format defined in both RATs, e.g. the C-RNTI and the PCI from LTE, or the C-RNTI and the PCI from NR, using e.g. a CHOICE structure. The message with the one or more new fields and/or IEs may be used for UE identification in both intra-RAT Reestablishment and inter-RAT Reestablishment. This may be defined in only the LTE specification, only the NR specification, or in both LTE and NR specifications depending on which RAT one supports as a target RAT for re-establishment upon inter-RAT cell selection.

Some fourth exemplifying embodiments. Extend definition of existing variables/fields to use dummy values in the target RAT format for source parameters, e.g. for the C-RNTI and/or the PCI. This may for instance be to use values of PCI outside the normal range of PCIs, i.e. values between 504-512 in LTE and values between 1008-1023 in NR.

Some fifth exemplifying embodiments. The UE is provided in the first RAT with an inter-RAT UE identifier in the format of at least one potential target RAT for re-establishment. And, upon the re-establishment, the UE identifier is included in the re-establishment request message sent to the target RAT.

For some of these alternatives, where there may be ambiguity in the target cell between intra-RAT information and inter-RAT information, an additional identifier is added to the re-establishment request message to distinguish an inter-RAT re-establishment request from an intra-RAT re-establishment request. This may have different levels of granularities, such as a single-bit or flag, or a source RAT identifier to resolve potential ambiguities. There may be other mechanisms in lower layers, such as Random Access Channel (RACH) resources only available for inter-RAT re-establishments. This may be indicated in system information.

Sometimes in this disclosure reference to the expiry of a timer is made. It should be understood that such a reference refers to the expiry of a time period.

It should be understood that one or more features from one or more exemplifying embodiments may be combined.

An object of embodiments herein is therefore to improve the performance of a wireless communications network for re-establishing a radio connection.

Embodiments herein may refer to Connection re-establishment, inactive state, RRC, security procedures.

An advantage of embodiments disclosed herein is that they enable a UE connected in a first RAT, e.g. in LTE or in NR, to attempt to reestablish in a second RAT if the UE experiences a failure in the first RAT triggering re-establishment. Thanks to that, faster recovery is possible as the RRC reestablishment procedure is expected to be faster to execute than transition via an RRC_IDLE state which is the existing solution for the inter-RAT scenarios in the Rel-15 specifications. This is particularly likely since the NR may be deployed in quite high frequencies and may rely on beamforming, where radio related failures may be more common than in current systems.

Without embodiments disclosed herein, the UE cannot be identified at the network side during an inter-RAT reestablishment procedure or any procedure where source and re-establishment target have different formatting for the UE identifier.

For the different alternatives presented in the previous section we have the following advantages:

Some first exemplifying embodiments. Convert source RAT parameters, such as the C-RNTI and the PCI of the source RAT, to target RAT message format by mapping, recalculating, truncating, or padding; and use variables defined in the target RAT. Advantage: No need to change the existing message format in a potential target RAT for inter-RAT re-establishment. Consequently, one may not need to create or use an additional logical channel in the target RAT.

Some second exemplifying embodiments. Create a new inter-RAT re-establishment message in the target RAT allowing source RAT parameters, e.g. the C-RNTI and the PCI of the source RAT, in the source RAT format to be transmitted in the second RAT during re-establishment. Advantage: A new logical channel may be defined for that purpose which may facilitate the distinction between an inter-RAT request and an intra-RAT request. That is important since the target node needs to perform actions depending on that e.g. identify which node, e.g. gNB, or eNB, it will request the UE AS Context from, in case that is not prepared. Or, in the case it is prepared and two different nodes, possibly from different RATs, have provided the UE AS context with same UE identifier, i.e. with the same C-RNTI and the same PCI.

Some third exemplifying embodiments. Create new inter-RAT Re-establishment fields and/or IEs or extend the existing Re-establishment message in each potential target RAT to allow both RAT formats for the UE identifiers format defined in both RATs, e.g. C-RNTI and PCI from LTE or C-RNTI and PCI from NR, using e.g. a CHOICE structure. The new message may be used for UE identification in both intra-RAT Reestablishment and in inter-RAT Reestablishment. This may be defined in only the LTE specification, only in the NR specification, or in both LTE and NR specifications. Advantage: There is no need to create or use a new logical channel. Only a bit or critical extension would need to be used for that purpose.

Some fourth exemplifying embodiments. Extend definition of existing variables and/or fields to use dummy values in the target RAT format for the source parameters, e.g. the C-RNTI and/or the PCI of the source RAT. Advantage: There is no need to create or use a new logical channel or to extend the message, though some coordination in the network is required as the target node receives less information in the Reestablishment request message, i.e. as the target node only receives dummy values.

Some fifth exemplifying embodiments. The UE is provided in the first RAT with an inter-RAT UE identifier in the format of at least one potential target RAT for re-establishment. And, upon the re-establishment, the inter-RAT UE identifier is included in the re-establishment request message sent to the target RAT. Advantage: No need to change message formatting in the specifications of the target RAT.

Embodiments herein are mostly exemplified with NR, LTE wireless devices but it may be applicable to other wireless devices which are served by other Radio Access Technologies such as CAT-M, NB-IoT, WiFi, or NR Carriers.

When a UE attempts to re-establish an RRC connection it must include a UE identity in the RRC Reestablishment Request message in order to locate the UE context used prior to the failure in order to properly re-establish the connection and resume the bearers.

If a UE is connected in one RAT, e.g. LTE or NR, where it experiences a failure and attempts to re-establish in another RAT, e.g. NR or LTE, the required input variables will be defined in different RATs. The parameters will have different sizes and characteristics in the different RATs.

Some embodiments disclosed herein relate to how to convert parameters used to locate the UE context upon inter-RAT reestablishment. Some embodiments disclosed herein also describe how to convey the inter-RAT parameters in the Reestablishment Request message.

This may be achieved either by modifying the content of an existing message or introducing a new message and modifying the procedures.

Figure 2:
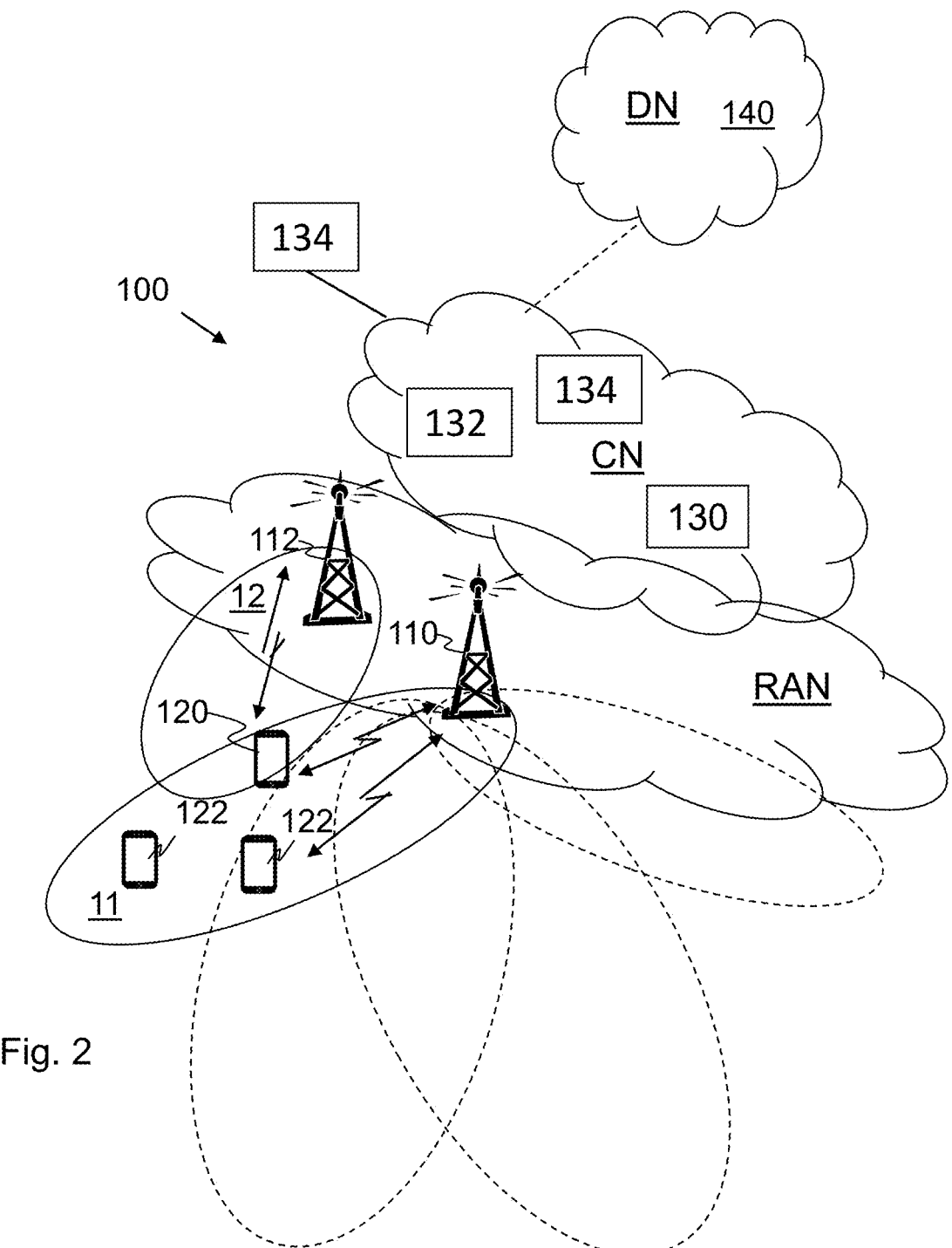
FIG. 2 is a schematic block diagram illustrating embodiments of a wireless communications network.

Embodiments herein relate to wireless communication networks in general. FIG. 2 is a schematic overview depicting a wireless communications network 100. The wireless communications network 100 may be referred to as a radio communications network. The wireless communications network 100 comprises one or more Radio Access Networks (RANs) and one or more Core Networks (CNs). The radio communications network 100 may use a number of different Radio Access Technologies (RATs), such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Sometimes in this disclosure the wireless communications network 100 is referred to as just a network.

In the wireless communication network 100, wireless devices e.g. a wireless device 120 also referred to as the first UE 120, is operating in the wireless communications network 100. One or more further wireless devices 122 also referred to as one or more second UEs 122 may operate in the wireless communications network 100. As schematically illustrated in FIG. 2, the wireless device 120,122 may communicate with a network node, e.g. a network node 110, 112 which will be described below.

The wireless devices 120, 122 may each e.g. be a mobile station, a non-Access Point (non-AP) STA, a STA, a user equipment (UE) and/or a wireless terminals, an NB-IoT device, an eMTC device, Integrated Access Backhaul (IAB) node and a CAT-M device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

In this disclosure, the terms wireless device, terminal and UE are used interchangeably.

Network nodes operate in the radio communications network 100, such as a Radio Network Node (RNN) 110,112 also referred to as the first network node 110 and the second network node 112, respectively, providing radio coverage over a respective geographical area, e.g. a service area 11 and a service area 12, which may also be referred to as cells, beams or beam groups of a first Radio Access Technology (RAT), or a second RAT. The first and second RATs may be different RATs such as one of the RATs is a NR, 5G, LTE, Wi-Fi, NB-IoT, CAT-M, Wi-Fi, eMTC or similar, and the other RAT is another one of the NR, 5G, LTE, Wi-Fi, NB-IoT, CAT-M, Wi-Fi, eMTC or similar. The network node 110,112 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a Next Generation Radio Access Network eNB (NG-RAN eNB, ng-eNB), a gNB, a base transceiver station, a radio remote unit, an Access Point Base Station, a base station router, a transmission arrangement of a radio base station, a stand-alone access point or any other network unit capable of communicating with a wireless device within the service area served by the network node 110,112 depending e.g. on the radio access technology and terminology used. The network node 110 may be referred to as a serving radio network node and communicates with the wireless device 120, 122 with Downlink (DL) transmissions to the wireless device 120, 122 and Uplink (UL) transmissions from the wireless device 120, 122.

Further network nodes operate in the radio communications network 100, such as a Mobility Network Node (MNN) 130 also referred to as a third network node 130. The network node 130 may be a Mobility Management Entity (MME) which is a control node for an LTE access network, a Serving Gateway (SGVV), and a Packet Data Network Gateway (PGVV). The MME is amongst other responsible for tracking and paging procedure including retransmissions. Further the network node 130 may be an Access and Mobility Management Function (AMF) which is a control node for a 5GS access network, and a User Plane Function (UPF). Further, the network node 130 may be an Operation And Maintenance (OAM) node such as an Operation and Support System Radio and Core (OSS-RC) node or an Ericsson Network Management (ENM) node.

Further network nodes such as a location server 132 and a positioning server 134 operate in the radio communications network 100. For example, the location server 30,132 may be an E-SMLC and the positioning server 134 may be an RTK server. The location server 132 and the positioning server 134 may communication with each other over a communications interface.

It should be understood that the positioning server 134 may be arranged external of the radio communications network 100 and in such a scenario the positioning server 134 may be referred to as an external positioning server 132 and the location server 132 and the positioning server 134 may communicate over an IP interface.

The positioning server 134 may sometimes herein be referred to as an RTK server or an RTK network provider.

Methods according to embodiments herein may be performed by any of the network node 110 such as e.g. an eNB, the wireless device 120, e.g. the UE, the mobility network node 130, the location server 132 and/or by the positioning server 134. As an alternative, a Distributed Node (DN) and functionality, e.g. comprised in a cloud 140 as shown in FIG. 5 may be used for performing or partly performing the methods.

In this disclosure, the first RAT is the RAT of the first radio network node 110 serving the wireless device 120 when operating in a first service area 11, e.g. a first cell 11, and the second RAT is the RAT of a second radio network node 112 serving a second cell 12. Further, the wireless device 120 is suspended from a connection with the first radio network node 110 which connection is to be re-established by the second radio network node 112. Sometimes in this disclosure, the term "source node/cell" is used instead of the term "first RAT/node/cell", and the term "target RAT/node/cell" is used instead of the term "second RAT/node/cell". Thus, it may for example be said that the wireless device 120 is suspended from a connection with the source radio network node 110 and that the target radio network node 112 is to re-establish the connection.

Actions of Some Embodiments Herein

Figure 3:
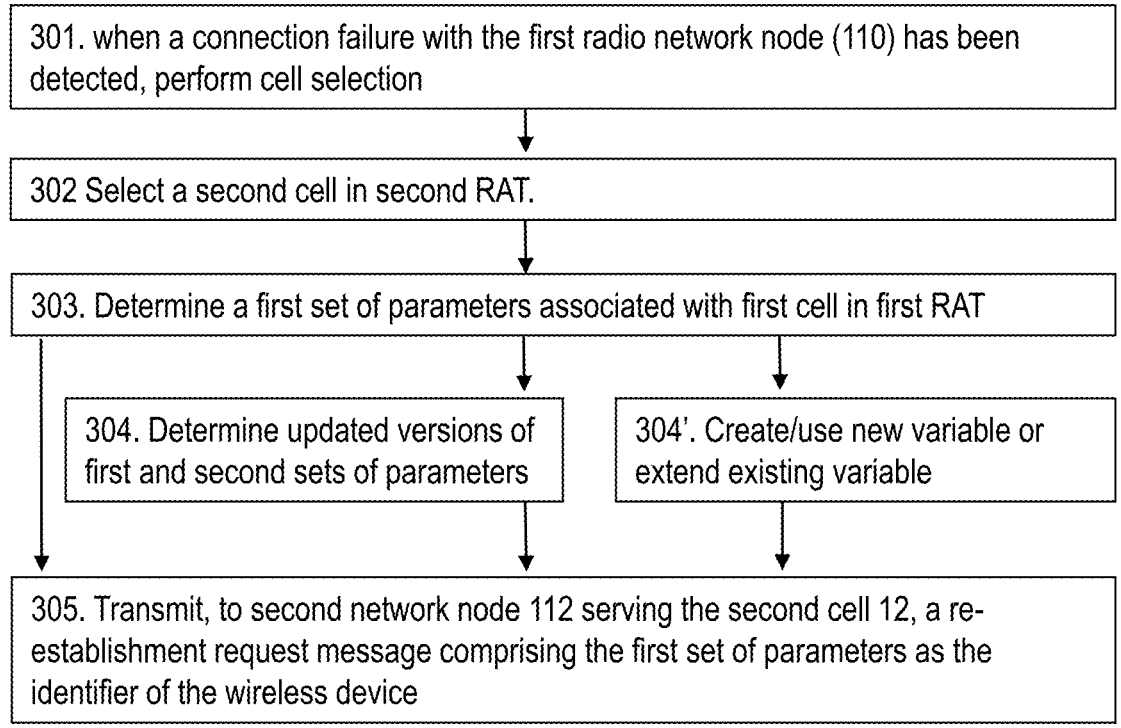
FIG. 3 is a flowchart depicting embodiments of methods in a wireless device.

Example embodiments of a flowchart depicting embodiments of a method performed by the wireless device 120, 122, e.g. to re-establish a connection, is depicted in FIG. 3 and will be described more in detail in the following. Especially, embodiments herein relates to a method performed by a wireless device 120 for re-establishing a radio connection in a wireless communications network 100 comprising a first Radio Access Technology (RAT) and a second RAT, wherein the wireless device 120 operates in a first cell 11 served by a first radio network node 110 operating in the first RAT. The first and second RATs are different RATs. The method may comprise one or more of the following actions which actions may be taken in any suitable order. Further, it should be understood that one or more actions may be optional and that actions may be combined. Especially, the method relates to actions performed by the wireless device 120 when a connection failure with the first cell 11 served by the first radio network node 110 is or as been detected.

In Action 301, when a connection failure with a first cell 11, e.g. with the first radio network node 110, has been detected, the wireless device 120,122 performs a cell selection.

In Action 302, the wireless device 120,122 selects a second cell 12 in the second RAT. Thus, the wireless device 120,122 selects a second cell 12 served by a second radio network node 112 operating in the second RAT. The second cell 12 is known by the wireless device 120 to be a candidate for re-establishment.

In Action 303, the wireless device 120,122 determines and/or receives a first set of parameters associated with the first cell 11 of the first RAT. As previously mentioned, the first cell 11 is served by the first radio network node 110 operating in the first RAT. The first set of parameters comprises at least one parameter identifying the wireless device 120 or the first cell 11. The first set of parameters may comprise the C-RNTI and the PCI. In other words, the wireless device 120, 122 determines a first set of parameters to be used as an identifier of the wireless device 120. As mentioned above, the first set of parameters is associated with the first cell 11.

In some embodiments, the wireless device 120 receives, e.g. from the second radio network node 112, an instruction how to convert parameters in one format into another format.

In Action 304, the wireless device 120,122 may determine updated versions of the first set of parameters. Additionally or alternatively, in Action 304A', the wireless device 120 creates or uses a new variable or extends an existing variable.

The wireless device may determine an updated version of one or more parameters of the first set of parameters. For example, the wireless device may update the first set of parameters to have a format corresponding to a format of the second RAT.

In some embodiments, e.g. in some first exemplifying embodiments, the wireless device determines the updated version of the one or more parameters of the first set of parameters by converting the one or more parameters of the first set of parameters to a format corresponding to the format of the one or more parameters of the second RAT, e.g. by mapping, recalculating, truncating or padding, and by using one or more variables defined in the second RAT. Thus, the wireless device converts the one or more parameters of the first set of parameters having a format of the first RAT into a format of the second RAT.

In other words, the wireless device 120, 122 may update the first set of parameters to have a format corresponding to the format of the second RAT by converting the one or more parameters of the first set of parameters to a format of a message for the second RAT. The conversion may be performed by performing one or more out of:

mapping, recalculating, truncating the one or more parameters of the first set of parameters to a shortened bit string when the first RAT is NR technology and the second RAT is LTE technology, and mapping, recalculating, or padding the one or more parameters of the first set of parameters to an extended bit string when the first RAT is LTE and the second RAT is NR.

Further, the wireless device 120, 122 may use the converted one or more parameters of the first set of parameters in one or more variables defined in the second RAT as the identifier of the wireless device in the re-establishment message.

In some embodiments, the wireless device creates and/or uses a new variable comprising the one or more parameters of the first set of parameters in the format of the first RAT and comprising the one or more parameters of the first set of parameters in the format of the second RAT. The new variable may comprise parameters having formats of more than one RAT.

For example, the C-RNTI has the formats: In LTE: 16 bit string and In NR: 16 bit integer, the PCI has the format: In LTE: 9 bit integer and In NR: 10 bit integer, and the Cell ID has the format: In LTE: 28 bit string and in NR: 36 bit string.

In some embodiments, the wireless device creates and/or uses a new variable or extending an existing variable to comprise the one or more parameters of the first set of parameters in both the format of the first RAT and in the format of the second RAT. The new variable may comprise parameters of only one format as in the legacy scenario or parameters of two or more formats according to embodiments disclosed herein.

When a reference is made to a new variable in this disclosure it should be understood to refer to a variable that is new in relation to the variables defined in the current standard, and which variable for example may comprise parameters having a format of two or more different RATs.

In some embodiments, the wireless device extends and/or uses definition of existing variables to use one or more values, e.g. predefined values, in the second RAT format for the one or more parameters of the first set of parameters. It should be understood that the value does not have to be predefined. It could also be values which are not associated with the first set of parameters. For instance, the network could signal that for inter-RAT re-establish, the first set of parameters should be 0, and in another cell, it should be 42 or something else. Thus in some embodiments, e.g. in some fourth exemplifying embodiments, the wireless device updates the first set of parameters to have a format corresponding to a format of the second RAT by extending definition of existing variables to use one or more values in the second RAT format in place of the one or more parameters of the first set of parameters.

In some embodiments, the wireless device receives an instruction how to update the first set of parameters. For example, the instruction may be received from the first radio network node 110 during link failure and from the second radio network node during re-establishment. In the latter case, the instruction may be broadcasted from the second radio network node. In such embodiments, the wireless device updates the first set of parameters in accordance with the instruction received.

In Action 305, the wireless device 120,122, transmits, to second network node 112 serving the second cell 12, a re-establishment request comprising the first set of parameters as the identifier, e.g. the UE identity, of the wireless device 120. In other words, the wireless device 120,122 transmits, to the second cell 12, a re-establishment request message comprising the first set of parameters as the identifier of the wireless device 120.

In some embodiments, e.g. in some second exemplifying embodiments, the wireless device transmits the re-establishment request message by transmitting the first set of parameters to the second radio network node 112 in an inter-RAT re-establishment request message. The inter-RAT re-establishment request message allows the first set of parameters in a format of the first RAT to be transmitted in the second RAT during re-establishment.

In some embodiments, e.g. in some third exemplifying embodiments, the wireless device transmits the re-establishment request message by transmitting the first set of parameters to the second radio network node 112 in an inter-RAT re-establishment request message. The inter-RAT re-establishment request message comprises one or more new inter-RAT re-establishment information elements to allow both a first RAT format and a second RAT format for the identifier of the wireless device 120 in the first and the second RAT, respectively.

In some embodiments, wherein the wireless device 120 in the first RAT is provided with an inter-RAT identifier in a format of at least one target cell in the second RAT for re-establishment, the wireless device transmits the inter-RAT identifier as the identifier of the wireless device 120 in the re-establishment request message to the second radio network node 112.

In some embodiments, the wireless device provides an additional identifier in the re-establishment request message, wherein the additional identifier indicates whether the re-establishment request message is an inter-RAT re-establishment request message or an intra-RAT re-establishment request message.

Figure 4:
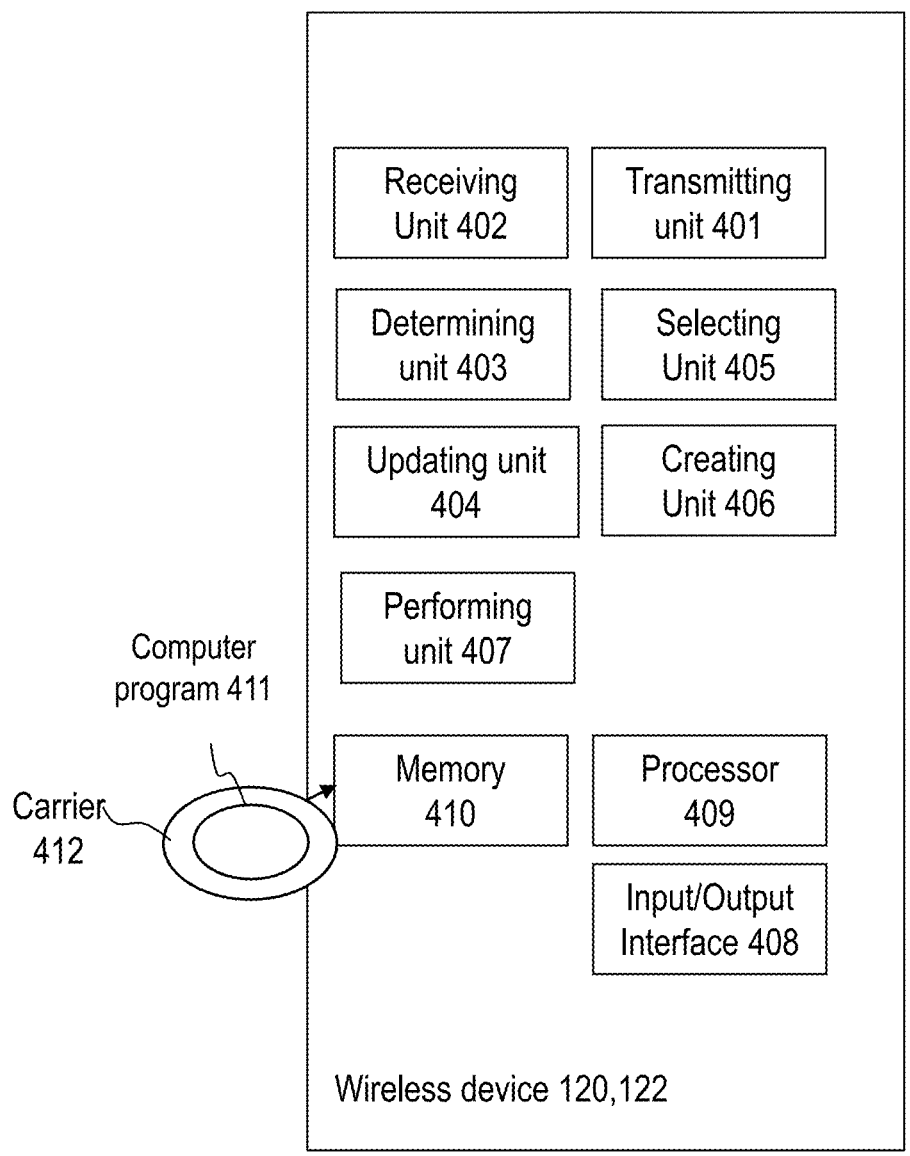
FIG. 4 is schematic block diagram illustrating embodiments of a wireless device.

To perform the method actions e.g. for re-establishing a connection in the wireless communications network 100, the wireless device 120 may comprise the arrangement depicted in FIG. 4. As previously mentioned, the wireless communications network 100 comprises the first RAT and the second RAT being different from the first RAT. The wireless device 120 is configured to operate in the first cell 11 served by the first radio network node 110 configured to operate in the first RAT.

The wireless device 120,122 may e.g. comprise a transmitting unit 401, a receiving unit 402, a determining unit 403, an updating unit 404, a selecting unit 405, a creating unit 406, and a performing unit 407. As previously mentioned, the wireless device 120 is configured to operate in the wireless communications network 100. The wireless device 120 is configured to perform, e.g. by means of the one or more units, one or more of the actions performed by the wireless device 120 and described herein when a connection failure with the first cell served by the first radio network node 110 is detected.

The wireless device 120 is configured to transmit, e.g. by means of the transmitting unit 401, a signal, message or information to one or more nodes operating in the communications network 100. The transmitting unit 401 may be implemented by or arranged in communication with a processor 409 of the wireless device 120. The processor 408 will be described in more detail below.

The wireless device 120,122 is configured to transmit, to the second cell 12, a re-establishment request message comprising the first set of parameters as the identifier of the wireless device 120.

In some embodiments, the wireless device is configured to transmit the re-establishment request message by further being configured to transmit the first set of parameters to the second radio network node 112 in an inter-RAT re-establishment request message. The inter-RAT re-establishment request message allows the first set of parameters in a format of the first RAT to be transmitted in the second RAT during re-establishment.

In some embodiments, the wireless device is configured to transmit the re-establishment request message by further being configured to transmit the first set of parameters to the second radio network node 112 in an inter-RAT re-establishment request message. The inter-RAT re-establishment request message comprises one or more new inter-RAT re-establishment information elements to allow both a first RAT format and a second RAT format for the identifier of the wireless device 120 in the first and the second RAT, respectively.

In some embodiments, the wireless device in the first RAT is provided with an inter-RAT identifier in a format of at least one target cell in the second RAT for re-establishment. In such embodiments, the wireless device 120 is configured to transmit the re-establishment request message by further being configured to transmit the inter-RAT identifier as the identifier of the wireless device 120 in the re-establishment request message to the second radio network node 112.

The wireless device 120 may be configured to provide an additional identifier in the re-establishment request message. The additional identifier indicates whether the re-establishment request message is an inter-RAT re-establishment request message or an intra-RAT re-establishment request message.

The wireless device 120 is configured to receive, e.g. by means of the receiving unit 402, a signal, message or information from one or more nodes operating in the communications network 100. The receiving unit 402 may be implemented by or arranged in communication with the processor 409 of the wireless device 120.

The wireless device 120,122 is configured to receive a first set of parameters from the first radio network node 112.

The wireless device 120 is configured to determine, e.g. by means of the determining unit 403, an identifier of the wireless device. The determining unit 403 may be implemented by or arranged in communication with the processor 409 of the wireless device 120.

The wireless device 120,122 is configured to determine a first set of parameters to be used as an identifier of the wireless device 120. The first set of parameters is associated with the first cell. The wireless device may have received the first set of parameters before the connection failure with the first cell. Upon a connection failure with the first cell, the wireless device may retrieve the previously received first set of parameters.

The first wireless device 120 may be configured to update, e.g. by means of the updating unit 404, one or more parameters of the first set of parameters and/or one or more parameters of a second set of parameters. The updating unit 404 may be implemented by or arranged in communication with the processor 409 of the first wireless device 120.

Thus, the wireless device 120,122 may be configured to update the first set of parameters to have a format corresponding to a format of the second RAT.

In some embodiments, the wireless device 120 of is configured to update the first set of parameters to have a format corresponding to the format of the second RAT by being configured to convert the one or more parameters of the first set of parameters to a format of a message for the second RAT by performing one or more out of:

mapping, recalculating or truncating the one or more parameters of the first set of parameters to a shortened bit string when the first RAT is 5G New Radio, NR, technology and the second RAT is a Long Term Evolution, LTE, technology, and mapping, recalculating or padding the one or more parameters of the first set of parameters to an extended bit string when the first RAT is LTE and the second RAT is NR.

In such embodiments, the wireless device 120 may be configured to use the converted one or more parameters of the first set of parameters in one or more variables defined in the second RAT as the identifier of the wireless device 120 in the re-establishment message.

In some embodiments, the wireless device 120 is configured to update the first set of parameters to have a format corresponding to a format of the second RAT by further being configured to extend definition of existing variables to use one or more values in the second RAT format in place of the one or more parameters of the first set of parameters.

The wireless device 120 is configured to select, e.g. by means of the selecting unit 505, a cell. The selecting unit 505 may be implemented by or arranged in communication with the processor 509 of the wireless device 120.

The wireless device 120,122 is configured to select a second cell 12 served by the second radio network node 112 operating in the second RAT. The second cell 12 is known by the wireless device 120 to be a candidate for re-establishment.

The wireless device 120 is configured to create, e.g. by means of the creating unit 406, a new variable or a new IE. The creating unit 406 may be implemented by or arranged in communication with the processor 409 of the wireless device 120.

The wireless device 120 is configured to perform, e.g. by means of the performing unit 407, a cell selection. The performing unit 407 may be implemented by or arranged in communication with the processor 409 of the wireless device 120.

The wireless device 120,122 is configured to perform a cell selection when a connection failure with the first cell 11 served by the first radio network node 110 is or has been detected.

Those skilled in the art will also appreciate that the units in the wireless device 120,122 described above may refer to a combination of analog and digital circuits, and/or one or more processors configured with software and/or firmware, e.g. stored in the wireless device 120, 122, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The wireless device 120,122 may comprise an input and output interface 408 configured to communicate with one or more network nodes, e.g. with the first and second radio network nodes 110,112 and the location server 132. The input and output interface may comprise a wireless receiver (not shown) and a wireless transmitter (not shown).

The embodiments herein may be implemented through a respective processor or one or more processors, such as the processor 409 of a processing circuitry in wireless device 120,122 depicted in FIG. 4, together with respective computer program code for performing the functions and actions of the embodiments herein. The program code mentioned above may also be provided as a computer program product, for instance in the form of a data carrier carrying computer program code for performing the embodiments herein when being loaded into the wireless device 120,122. One such carrier may be in the form of a CD ROM disc. It is however feasible with other data carriers such as a memory stick. The computer program code may furthermore be provided as pure program code on a server and downloaded to the wireless device 120,122.

The wireless device 120,122 may further comprise a memory 410 comprising one or more memory units. The memory comprises instructions executable by the processor in the wireless device 120.

The memory is arranged to be used to store e.g. data, configurations, and applications to perform the methods herein when being executed in the wireless device 120,122.

Some embodiments of the wireless device 120,122 may comprise:

a radio circuitry configured to determine/receive first set of parameters according to the determined by a processing unit, and to transmit a re-establishment request;

a storage, configured to store first set of parameters;

the processing unit configured to determine UE identity.

Example embodiments of a flowchart depicting embodiments of a method performed by the first radio network node 110 for assisting a wireless device 120,122 in re-establishing a radio connection in a wireless communications network 100 is depicted in FIG. 5A and will be described more in detail in the following. As previously mentioned the wireless communications network 100 comprises a first RAT and a second RAT. The second RAT is different from the first RAT. The wireless device 120 operates in a first cell 11 served by the first radio network node 110 operating in the first RAT The method may comprise one or more of the following actions which actions may be taken in any suitable order. Further, it should be understood that one or more actions may be optional and that actions may be combined.

In Action 501A, the first radio network node 110 provides the wireless device 120,122 with a first set of parameters associated with a first cell 11 of the first RAT. The first set of parameters may comprise C-RNTI and PCI.

In Action 502, the first radio network node 110 may provide the wireless device with an instruction how to convert parameters into another format.

In Action 503A, the first radio network node 110 receives from the second radio network node 112 a UE identity.

In Action 504A, the first radio network node 110 locates one or more configurations and/or parameters relating to the wireless device 120,122 based on the received UE identity.

In Action 505A, the first radio network node 110 transmits to second radio network node 112 one or more configurations and/or parameters relating to the radio connection to be re-established.

Figure 5B:
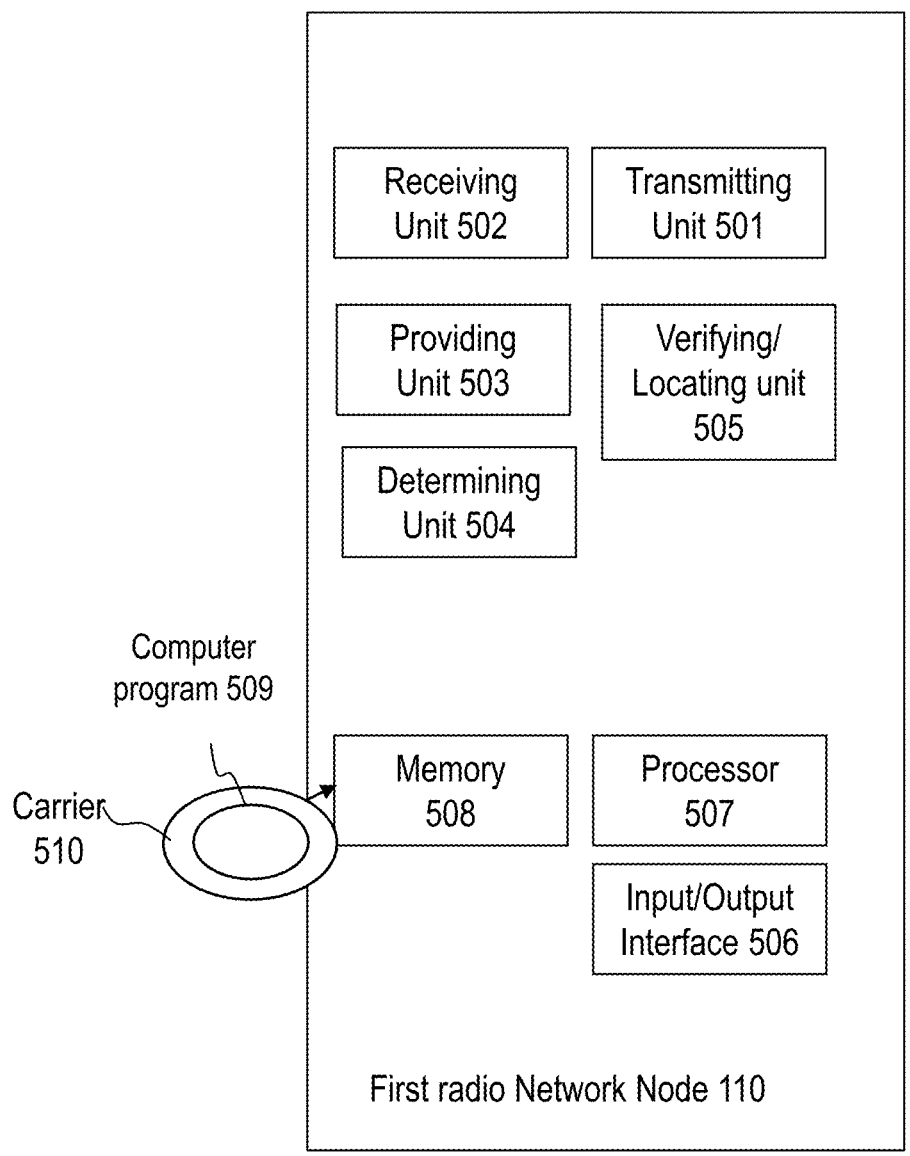
FIG. 5B is schematic block diagram illustrating embodiments of a first radio network node.

To perform the method actions e.g. for assisting a wireless device 120,122 in resuming a radio connection in a wireless communications network 100, the first radio network node 110 may comprise the arrangement depicted in FIG. 5B. The first radio network node 110 may e.g. comprise a transmitting unit 501, a receiving unit 502, a providing unit 503, a determining unit 504, and a verifying unit 505.

Those skilled in the art will also appreciate that the units in the first radio network node 110 described above may refer to a combination of analog and digital circuits, and/or one or more processors configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The radio network node 110 may comprise an input and output interface 506 configured to communicate with one or more out of the wireless device 120, 122, the second radio network node 112, the network node 130, and the location server 132. The input and output interface may comprise a wireless receiver (not shown) and a wireless transmitter (not shown).

The embodiments herein may be implemented through a respective processor or one or more processors, such as the processor 507 of a processing circuitry in network node 110 depicted in FIG. 5B, together with respective computer program code for performing functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 508 comprising one or more memory units. The memory comprises instructions executable by the processor in the network node 110.

The memory is arranged to be used to store e.g. data, configurations, and applications to perform the methods herein when being executed in the network node 110. For example, the memory may comprise the buffer having the buffer size referred to herein.

Some embodiments of the first radio network node 110 may comprise:

a communication circuitry configured to provide wireless device with first set of parameters, possibly also with an instruction how to update parameters, receive a UE identity from second radio network node, and to transmit configurations and/or parameters to the second radio network node, a storage configured to store set of parameters and UE identities, a processing unit configured to verify the wireless device and a radio circuitry configured to transmit configurations and/or parameters to second radio network node.

Example embodiments of a flowchart depicting embodiments of a method performed by the second radio network node 112 for assisting a wireless device 120,122 in re-establishing a radio connection in a wireless communications network 100 is depicted in FIG. 6A and will be described more in detail in the following. As previously mentioned the wireless communications network 100 comprises a first RAT and a second RAT. The second RAT is different from the first RAT. The wireless device 120 operates in a first cell 11 served by the first radio network node 110 operating in the first RAT The method may comprise one or more of the following actions which actions may be taken in any suitable order. Further, it should be understood that one or more actions may be optional and that actions may be combined.

In Action 601A, the second radio network node 112 may provide the wireless device with an instruction how to convert parameters in one format into another format. Thus, the second radio network node 112 may provide the wireless device 120 with an instruction how to convert one or more parameters of a first set of parameters associated with the first cell 11 into a format corresponding to the format of the second RAT or how to convert the one or more parameters of the second set of parameters into a format corresponding to the format of the first RAT.

In Action 602A, the second radio network node 112 receives a re-establishing request from the wireless device, which re-establishing request comprises a first set of parameter as identifier of the wireless device 120, e.g. a UE identity. The re-establishing request message is transmitted by the wireless device 120 as detected or is detecting a connection failure with the first cell 11.

In Action 603A, the second radio network node 112 transmits the received UE identity to the first radio network node 110.

In Action 604A, the second radio network node 112 receives, from the first radio network node 110, one or more configurations and/or parameters relating to the radio connection to be re-established. The one or more configurations and/or parameters are sometimes in this disclosure referred to as UE context.

In Action 605A, the second radio network node 112 re-establishes the connection with the wireless device 120. The second radio network node 112 may perform the re-establishment of the connection based on the received one or more configurations and/or parameters.

Figure 6B:
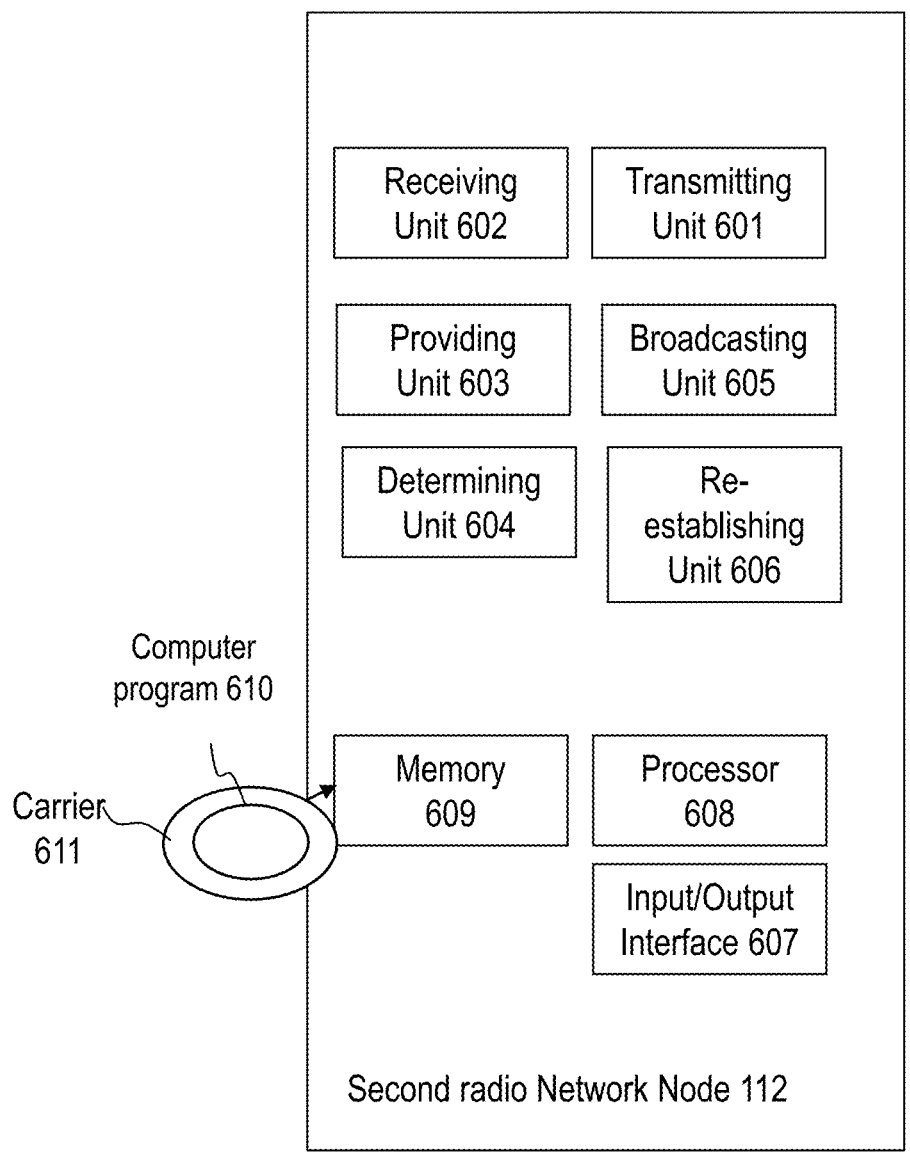
FIG. 6B is schematic block diagram illustrating embodiments of a second radio network node.

To perform the method actions e.g. for assisting a wireless device 120,122 in re-establishing a radio connection in a wireless communications network 100, the second radio network node 112 may comprise the arrangement depicted in FIG. 6B. As previously mentioned, the wireless communications network 100 comprises a first RAT and a second RAT being different from the first RAT. The wireless device 120 is configured to operate in a first cell 11 served by a first radio network node 110 configured to operate in the first RAT, and the second radio network node 112 is configured to operate in the second RAT. The second radio network node 112 may e.g. comprise a transmitting unit 601, a receiving unit 602, a providing unit 603, a determining unit 604, broadcasting unit 605 and a re-establishing unit 606. As previously mentioned, the wireless device 120 and the second radio network node 112 are configured to operate in the wireless communications network 100. The second radio network node 112 is configured to perform, e.g. by means of the one or more units, one or more of the actions performed by the second radio network node 112 and described herein.

The second radio network node 112 is configured to transmit, e.g. by means of the transmitting unit 601, a signal, message or information to one or more nodes operating in the communications network 100. The transmitting unit 601 may be implemented by or arranged in communication with a processor 608 of the second radio network node 112. The processor 608 will be described in more detail below.

The second radio network node 112 is configured to transmit an identifier of the wireless device 120 to the first radio network node 110.

The second radio network node 112 is configured to receive, e.g. by means of the receiving unit 602, a signal, message or information from one or more nodes operating in the communications network 100. The receiving unit 602 may be implemented by or arranged in communication with the processor 608 of the second radio network node 112.

The second radio network node 112 is configured to receive a re-establishment request message comprising an identifier of the wireless device 120 transmitting the re-establishment request message when a failure of a radio connection with the first radio network node 110 has been detected.

The second radio network node 112 is configured receive, from the first radio network node 110, one or more configurations and/or parameters relating to the radio connection to be re-established. The one or more configurations and/or parameters may be received in response to the identity of the wireless device 120 transmitted from the second radio network node 112 to the first radio network node 110.

The second radio network node 112 is configured to provide, e.g. by means of the providing unit 603, information, instructions and/or parameters etc. to nodes operating in the communications network. The providing unit 603 may be implemented by or arranged in communication with the processor 608 of the second radio network node 112.

The second radio network node 112 is configured to provide the wireless device 120 with an instruction how to convert one or more parameters of a first set of parameters associated with the first cell 11 into a format corresponding to the format of the second RAT or how to convert the one or more parameters of the second set of parameters into a format corresponding to the format of the first RAT. The second radio network node 112 may transmit the instruction to the wireless device 120.

The second radio network node 112 is configured to determine, e.g. by means of the determining unit 604, a network node. The determining unit 604 may be implemented by or arranged in communication with the processor 608 of the second radio network node 112.

The second radio network node 112 is configured to determine the first radio network node 110 based on the identifier.

The second radio network node 112 may be configured to broadcast, e.g. by means of the broadcasting unit 605, a signal, message or information to nodes operating in the communications network 100. The broadcasting unit 605 may be implemented by or arranged in communication with the processor 608 of the second radio network node 112.

The second radio network node 112 is configured to re-establish, e.g. by means of the re-establishing unit 606, a connection. The re-establishing unit 606 may be implemented by or arranged in communication with the processor 608 of the re-establishing unit 606.

The second radio network node 112 is configured to re-establish the connection with the wireless device 120 based on the one or more configurations and/or parameters, e.g. based on the UE context received from the first radio network node 110.

Those skilled in the art will also appreciate that the units in the second radio network node 112 described above may refer to a combination of analog and digital circuits, and/or one or more processors configured with software and/or firmware, e.g. stored in the network node 112 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The second radio network node 112 may comprise an input and output interface 607 configured to communicate with one or more out of the wireless device 120, 122, the first radio network node 110, the network node 130, and the location server 132. The input and output interface may comprise a wireless receiver (not shown) and a wireless transmitter (not shown).

The embodiments herein may be implemented through a respective processor or one or more processors, such as the processor 608 of a processing circuitry in network node 112 depicted in FIG. 6B, together with respective computer program code for performing functions and actions of the embodiments herein. The program code mentioned above may also be provided as a computer program product, for instance in the form of a data carrier carrying computer program code for performing the embodiments herein when being loaded into the network node 112. One such carrier may be in the form of a CD ROM disc. It is however feasible with other data carriers such as a memory stick. The computer program code may furthermore be provided as pure program code on a server and downloaded to the network node 112.

The network node 112 may further comprise a memory 609 comprising one or more memory units. The memory comprises instructions executable by the processor in the network node 112.

The memory is arranged to be used to store e.g. data, configurations, and applications to perform the methods herein when being executed in the network node 112. For example, the memory may comprise the buffer having the buffer size referred to herein.

Some embodiments of the second radio network node 112 may comprise:
a communication circuitry configured to provide the wireless device an instruction how to update parameters, receive a UE identity from wireless device and to transmit the UE identity to the first radio network node, and to receive one or more configurations and/or parameters to re-establish a connection with the wireless device.
a storage configured to store set of parameters and UE identities,
a processing unit and
a radio circuitry configured to receive configurations and/or parameters from the first radio network node and to re-establish radio connection with the wireless device.

In some embodiments, a respective computer program 509, 610 comprises instructions, which when executed by the respective at least one processor, cause the at least one processor of the network node 110,112 to perform one or more of the actions described herein.

In some embodiments, a respective computer program 411 comprises instructions, which when executed by the respective at least one processor, cause the at least one processor of the wireless device 120,122 to perform the actions described herein.

In some embodiments, a respective carrier 412, 510, 611 comprises the respective computer program, wherein the carrier is one of an electronic signal, an optical signal, an electromagnetic signal, a magnetic signal, an electric signal, a radio signal, a microwave signal, or a computer-readable storage medium.

Below a more detailed description will follow.

Embodiments disclosed herein may be separated into different parts which will be described in more detail below.

Some example Embodiments numbered 1-12 are described below.

The following embodiments refer among other things to FIG. 2, FIG. 3, and FIG. 4.

Embodiment 1. A method performed by a wireless device (120) for re-establishing a radio connection in a wireless communications network (100) comprising a first Radio Access Technology, RAT, and a second RAT, wherein the wireless device (120) operates in a first cell (11) served by a first radio network node (110) operating in the first RAT, and wherein the method comprises:
when a connection failure with the first radio network node (110) has been detected,
performing (301), e.g. by means of a performing unit, cell selection and selecting (302), e.g. by means of a selecting unit, a second cell (12) in the second RAT, which second cell is known by the wireless device to be a candidate for re-establishment;

determining (303), e.g. by means of a determining unit, a first set of parameters to be used as an identifier of the wireless device (120), wherein the first set of parameters is associated with the first cell (11) served by the first radio network node (110) operating in the first RAT; and transmitting (305), e.g. by means of a transmitting unit, to a second radio network node (112) of the second RAT, a re-establishment request message comprising the first set of parameters as the identifier of the wireless device (120).

Embodiment 2. The method of embodiment 1, further comprising:

updating (304) the first set of parameters to have a format corresponding to a format of the second RAT.

Embodiment 3. The method of embodiment 2, wherein the updating (304) of the first set of parameters to have a format corresponding to a format of the second RAT comprises:

converting the one or more parameters of the first set of parameters to a format of a message for the second RAT, e.g. by mapping, recalculating, truncating or padding, and by using one or more variables defined in the second RAT.

For example, this may relate to some first exemplifying embodiments.

Embodiment 4. The method of embodiment 1, wherein the transmitting (305) of the re-establishment request message comprises:

transmitting the first set of parameters to the second radio network node (112) in an inter-RAT re-establishment request message, which inter-RAT re-establishment request message allows the first set of parameters to be transmitted in the second RAT during re-establishment.

For example, this may relate to some second exemplifying embodiments.

Embodiment 5. The method of embodiment 1, wherein the transmitting (305) of the re-establishment request message comprises:

transmitting the first set of parameters to the second radio network node (112) in an inter-RAT re-establishment request message, which inter-RAT re-establishment request message comprises one or more new inter-RAT re-establishment fields or information elements to allow both RAT formats for the identifier of the wireless device (120) in the first and the second RAT, respectively.

For example, this may relate to some third exemplifying embodiments.

Embodiment 6. The method of embodiment 2, wherein the updating (304) of the first set of parameters to have a format corresponding to a format of the second RAT comprises:

extending definition of existing variables to use one or more values, e.g. predefined values, in the second RAT format for the one or more parameters of the first set of parameters.

However, it should be understood that the value does not have to be predefined. It may be a value which is not associated with the first set of parameters. For instance, the network may signal that for inter-RAT re-establishment, the first set of parameters should be 0, and in another cell, it should be 42 (or something else).

For example, this may relate to some fourth exemplifying embodiments.

Embodiment 7. The method of embodiment 1, wherein the wireless device (120) in the first RAT is provided with an inter-RAT identifier in a format of at least one potential target RAT for re-establishment, and wherein the transmitting (305) of the re-establishment request message comprises:

transmitting the inter-RAT identifier in the re-establishment request message to the 15 second radio network node (112).

For example, this may relate to some fifth exemplifying embodiments.

Embodiment 8. The method of any one of embodiments 1-7, further comprising:

providing an additional identifier in the re-establishment request message, wherein the additional identifier indicates whether the re-establishment request message is an inter-RAT re-establishment request message or an intra-RAT re-establishment request message.

The following embodiments refer among other things to FIG. 2, FIGS. 5A,5B and FIGS. 6A,6B.

Embodiment 9. A method performed by a first radio network node (110) for assisting a wireless device (120) in re-establishing a radio connection in a wireless communications network (100) comprising a first Radio Access Technology, RAT, and a second RAT, wherein the wireless device (120) operates in a first cell (11) served by the first radio network node (110) operating in the first RAT, and wherein the method comprises:

providing (501A), e.g. by means of a providing unit, the wireless device (120) with a first set of parameters to be used as an identifier of the wireless device (120), wherein the first set of parameters is associated with the first cell (11) served by the first radio network node (110) operating in the first RAT;

receiving (503A), e.g. by means of a receiving unit, from the second radio network node (112, a UE identity received in a re-establishing request message from the wireless device (120) when a failure of a radio connection with the first radio network node (110) has been detected;

by means of the received UE identity, locating (504A) e.g. by means of a locating unit, one or more configurations and/or parameters of the wireless device's (120) identity;

transmitting (506A), to second radio network node (112), to one or more configurations and/or parameters relating to the radio connection to be re-established.

Embodiment 10. The method of embodiment 9, further comprising:

providing (501A) the wireless device (120) with an instruction how to convert one or more parameters of a first set of parameters associated with the first cell (11) into a format corresponding to the format of the second RAT or how to convert the one or more parameters of the second set of parameters into a format corresponding to the format of the one or more parameters of the first RAT.

Embodiment 11. A method performed by a second radio network node (112) for assisting a wireless device (120) in re-establishing a radio connection in a wireless communications network (100) comprising a first Radio Access Technology, RAT, and a second RAT, wherein the wireless device (120) operates in a first cell (11) served by a first radio network node (110) operating in the first RAT, wherein the second radio network node (112) operates in the second RAT, and wherein the method comprises:

providing (601A), e.g. by means of a providing unit, the wireless device (120) with a second set of parameters associated with a second cell (12) served by the second radio network node (112) operating in the second RAT, wherein the second set of parameters comprises at least one parameter identifying the wireless device (120) or the second cell (12);

receiving (602A), e.g. by means of a receiving unit, a re-establishment request message comprising a UE identity, which re-establishment request message is transmitted by the wireless device (120) when a failure of a radio connection with the first radio network node (110) has been detected;

transmitting (603A), e.g. by means of a transmitting unit, UE identity to the first radio network node (110);

receiving (604), e.g. by means of a receiving unit, from the first radio network node (110), one or more configurations and/or parameters relating to the radio connection to be re-established; and re-establishing (605), e.g. by means of a re-establishing unit, the connection with the wireless device (120).

Embodiment 12. The method of embodiment 11, further comprising:

providing (601A) the wireless device (120) with an instruction how to convert one or more parameters of a first set of parameters associated with the first cell (11) into a format corresponding to the format of the second RAT or how to convert the one or more parameters of the second set of parameters into a format corresponding to the format of the first RAT.

3.1 Introduction

Figure 7:
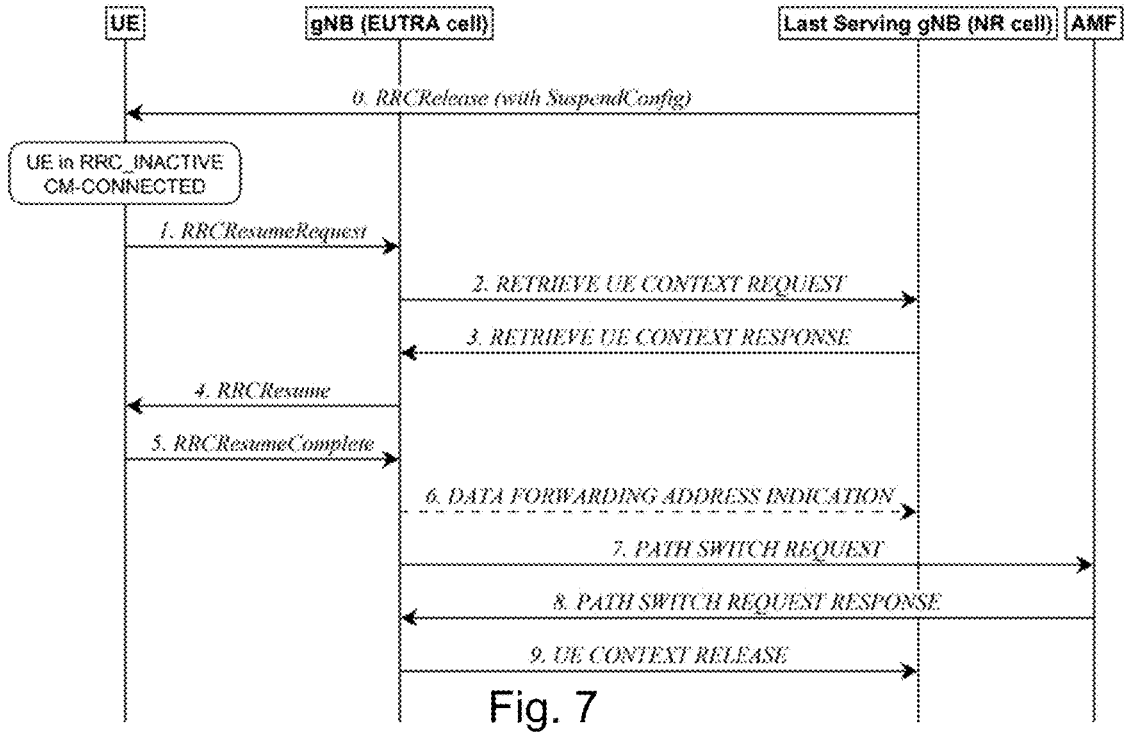
FIG. 7 is a combined signaling scheme and flowchart illustrating inter-RAT signaling when a UE connection with a NR cell served by a NR gNB is suspended, and when the UE connection is re-established with an E-UTRA cell served by an LTE gNB.
Figure 8:
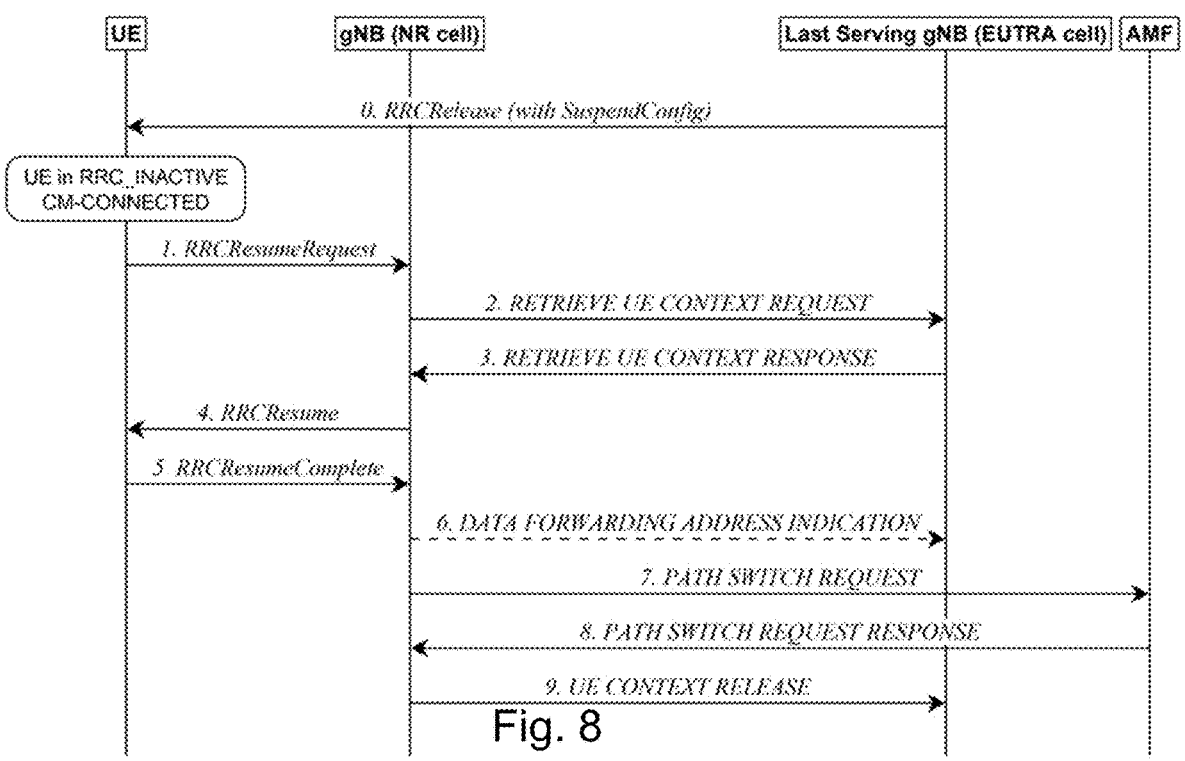
FIG. 8 is a combined signaling scheme and flowchart illustrating inter-RAT signaling when a UE connection with a LTE cell served by a LTE gNB is suspended, and when the UE connection is re-established with a NR cell served by an NR gNB.

In the context of some embodiments disclosed herein, the term inter-RAT re-establishment is mostly used when the UE, e.g. the wireless device 120,122, detects a failure in a first RAT while in an RRC_CONNECTED state, e.g. in NR, and, upon selecting a cell in a second RAT, e.g. in eLTE, triggers a re-establishment instead of going via an RRC_IDLE state as shown in the FIGS. 7 and 8 for the successful case. FIG. 7 schematically illustrates a signaling diagram for a UE performing inter-RAT reestablishment from NR to E-UTRA/5GC, and FIG. 8 schematically illustrates a signaling diagram for a UE performing inter-RAT reestablishment from E-UTRA/5GC to NR. In FIGS. 7 and 8, the eNB of the LTE serving the EUTRA cell is referred to as a gNB.

It should be understood that a reference to the UE in this disclosure is a reference to a wireless device 120,122, a reference to a first/source cell is a reference to the first cell 11 served by the first radio network node 110, and a reference to a second/target cell is a reference to the second cell 12 served by the second radio network node 112. Thus, the first radio network node 100 may also be referred to as a source radio network node or just a source network node, and the second radio network node 112 may be referred to as a target radio network node or just a target network node. Furthermore, a reference to a source eNB or source gNB is be a reference to the first radio network node 110 and a reference to a target eNB or target gNB is be a reference to the second radio network node 112.

The following alternative sub-mechanisms are proposed, mainly concerning the way the input parameters for the ue-Identity in the Reestablishment Request message should be determined.

3.2. Some First Exemplifying Embodiments: Convert Source Identifier into Format of Target RAT Message In this case the UE converts a UE identifier associated to a source cell in the source RAT (i.e. in the format of the source RAT e.g. in terms of number of bits) to a new UE identifier associated to a source cell in the source RAT but in the format of the second RAT (i.e. in the format of the target RAT e.g. in terms of number of bits) so that the UE identifier may properly fit in the message of the second RAT when the UE tries to re-establish in the second RAT. That new UE identifier is added to the re-establishment request message in the second RAT. That may be implemented in the specifications by describing (in field descriptions) the adaptation of UE identifier in the second RAT for the case when the UE has been connected in another RAT, e.g. updating the description of parameters in the field ReestabUE-Identity or similar IE (or fields within the IE).

3.2.1. RLF/Handover Failure in NR and Reestablishment in LTE (Problem 1)

If the UE is connected to a cell in NR and experiences RLF or handover failure, and attempts to reestablish in LTE, the UE need to provide the ReestabUE-Identity to the target eNB in the RRCConnectionReestablishmentRequest message:

| ReestabUE-Identity ::= | SEQUENCE { |
|---|---|
| c-RNTI | C-RNTI, |
| physCellId | PhysCellId, |
| shortMAC-I | ShortMAC-I |
| } | |

The C-RNTI is defined as a 16 bit integer (between 0 and 65535) in NR and defined as a 16 bit string in LTE. The UE may easily convert the 16 bit integer of the source NR C-RNTI to a 16 bit string and use it as the C-RNTI in the ReestabUE-Identity during inter-RAT RRC Reestablishment.

The physCellID (PCI) on the other hand is defined as an integer between 0 and 1007 in NR (coded as 10 bits) and defined as an integer between 0 and 503 in LTE (coded as 9 bits). If the UE should use the source PCI (i.e. the 10 bit NR PCI) in the RRCConnectionReestablishmentRequest message in LTE, the PCI need to be reduced in length by one bit. Below is a list of some possible methods how this conversion may be made although it should not be considered exhaustive or limiting with the regards to the solution.

Truncate the source NR PCI by removing any specific bit e.g. the least significant bit (LSB) or the most significant bit (MSB) or any of the other bits. The remaining 9 bits are used as the PCI in the Reestablishment request message.

Use the source NR PCI as input to an algorithm which maps it to 9 bits.

Regardless of which method is used to reduce the length of the NR PCI, there is some level of ambiguity (as information is removed) that is proposed to be resolved on the network side. That is done either prior to the re-establishment in preparing the target RAT nodes in how to interpret the converted PCI to find the source node and the UE AS context, or posterior when the UE requests the re-establishment, the target node must attempt to acquire the UE AS context from multiple potential source nodes which have overlapping PC's due to the conversion. For instance, there will be two possible NR PC's which have the same 9 LSB and there may be an additional LTE PCI with the same 9 bits if the NR and LTE PC's are not coordinated. In total, there may be 3 different source cells which need to be queried. In further embodiments at the end it is proposed to resolve any ambiguities by adding an inter-RAT identifier.

3.2.1.1. Updates to TS 36.331 (EUTRA Specifications)

The procedures and information elements in the LTE specifications (TS 36.331) may be updated to e.g.:

TS 36.331 section 5.3.7.4 Actions related to transmission of RRCConnectionReestablishmentRequest message Except for NB-IoT, if the procedure was initiated due to radio link failure or handover failure, the UE shall:

1> set the reestablishmentCellId in the VarRLF-Report to the global cell identity of the selected cell;

The UE shall set the contents of RRCConnectionReestablishmentRequest message as follows:

1> except for a NB-IoT UE for which AS security has not been activated, set the ue-Identity as follows:
2> if the UE was connected to an E-UTRA cell prior to the failure:
3> set the c-RNTI to the C-RNTI used in the source PCell (handover and mobility from E-UTRA failure) or used in the PCell in which the trigger for the re-establishment occurred (other cases);
3> set the physCellId to the physical cell identity of the source PCell (handover and mobility from E-UTRA failure) or of the PCell in which the trigger for the re-establishment occurred (other cases);
2> else if the UE was connected to an NR cell prior to the failure:
3> set the c-RNTI to the C-RNTI used in the source NR PCell (intra-NR reconfiguration with sync or mobility from NR failure) or used in the NR PCell in which the trigger for the re-establishment occurred (other cases);
3> set the physCellId to the 9 LSB of the physical cell identity of the source NR PCell (intra-NR reconfiguration with sync or mobility from NR failure) or of the NR PCell in which the trigger for the re-establishment occurred (other cases);

The field description of the Reestablishment request message would need to be updated to e.g.

| RRCConnectionReestablishmentRequest message |
| --- |
| -- ASN1START<br>RRCConnectionReestablishmentRequest ::= SEQUENCE {<br>    criticalExtensions    CHOICE {<br>        rrcConnectionReestablishmentRequest-r8<br>                RRCConnectionReestablishmentRequest-r8-IEs,<br>    criticalExtensionsFuture    SEQUENCE { }<br>    }<br>}<br>RRCConnectionReestablishmentRequest-r8-IEs ::= SEQUENCE {<br>    ue-Identity    ReestabUE-Identity,<br>    reestablishmentCause    ReestablishmentCause,<br>    spare    BIT STRING (SIZE (2))<br>}<br>ReestabUE-Identity ::=    SEQUENCE {<br>    c-RNTI    C-RNTI,<br>    physCellId    PhysCellId,<br>    shortMAC-I    ShortMAC-I<br>}<br>ReestablishmentCause ::=    ENUMERATED {<br>    reconfigurationFailure, handoverFailure,<br>    otherFailure, spare1}<br>-- ASN1STOP |

| RRCConnectionReestablishmentRequest field descriptions |
| --- |
| c-RNTI<br>Set to C-RNTI that the UE had in the PCell it was connected to prior to the failure. If the source cell was an NR cell, this field contain the source cell NR C-RNTI.<br>physCellId<br>The Physical Cell Identity of the PCell the UE was connected to prior to the failure. If the source cell was an<br>NR cell, this field contain the 9 LSB of the source cell PhysCellIdNR.<br>reestablishmentCause<br>Indicates the failure cause that triggered the re-establishment procedure. eNB is not expected to reject a RRCConnectionReestablishmentRequest due to unknown cause value being used by the UE.<br>ue-Identity<br>UE identity included to retrieve UE context and to facilitate contention resolution by lower layers. |

3.2.2. RLF/Handover Failure in LTE and Reestablishment in NR (Problem 2)

If the UE is connected to a cell in LTE and experiences RLF or handover failure, and attempts to reestablish in NR, the UE need to provide the ReestabUE-Identity to the target eNB in the RRCConnectionReestablishmentRequest message:

| | |
| --- | --- |
| ReestabUE-Identity ::= | SEQUENCE { |
| c-RNTI | RNTI-Value, |
| physCellId | PhysCellId, |
| shortMAC-I | ShortMAC-I |
| } | |

The C-RNTI is defined as a 16 bit integer (between 0 and 65535) in NR and defined as a 16 bit string in LTE. The UE may easily convert the 16 bit string of the source LTE C-RNTI to a 16 bit integer and use it as the C-RNTI in the ReestabUE-Identity during inter-RAT RRC Reestablishment.

The physCellID (PCI) on the other hand is defined as an integer between 0 and 1007 in NR (coded as 10 bits) and defined as an integer between 0 and 503 in LTE (coded as 9 bits). If the UE should use the source PCI (i.e. the 9 bit LTE PCI) in the RRCReestablishmentRequest message in NR, the PCI need to be extended in length by one bit. There are multiple methods to achieve this. Below is a list of some possible methods how this conversion may be made although it should not be considered exhaustive or limiting with the regards to the solution.

Padding the source LTE PCI by adding a leading or trailing bit set to either '0' or '1'.

Use the source LTE PCI as input to an algorithm which maps it to 10 bits.

Since the PC's of LTE and NR are not expected to be coordinated, it is possible that the padded LTE PCI will map to an existing NR PCI, which will lead to an ambiguity in where to find the UE AS context. This is solved in the network part of the method with querying multiple nodes with matching PC's.

3.2.2.1. Updates to TS 38.331

The procedures and information elements in the NR specifications (TS 38.331) may be updated to e.g.:

TS 38.331 section 5.3.7.4 Actions related to transmission of RRCReestablishmentRequest message which the trigger for the re-establishment occurred (other cases) with the MSB padded with zero;

RRCReestablishmentRequest Message

```
-- ASN1START
-- TAG-RRCREESTABLISHMENTREQUEST-START
RRCReestablishmentRequest ::= SEQUENCE {
    rrcReestablishmentRequest    RRCReestablishmentRequest-IEs
}
RRCReestablishmentRequest-IEs ::= SEQUENCE {
    ue-Identity                  ReestabUE-Identity,
    reestablishmentCause         ReestablishmentCause,
    spare                        BIT STRING (SIZE (1))
}
ReestabUE-Identity ::=           SEQUENCE {
    c-RNTI                       RNTI-Value,
    physCellId                   PhysCellId,
    shortMAC-I                   ShortMAC-I
}
ReestablishmentCause ::=         ENUMERATED {
                                 reconfigurationFailure,
handoverFailure, otherFailure, spare1}
-- TAG-RRCREESTABLISHMENTREQUEST-STOP
-- ASN1STOP
```

| RRCReestablishmentRequest field descriptions |
|---|
| c-RNTI<br>Set to C-RNTI that the UE had in the PCell it was connected to prior to the failure. If the source cell was an E-UTRA cell, this field contain the source cell E-UTRA C-RNTI.<br>physCellId<br>The Physical Cell Identity of the PCell the UE was connected to prior to the failure. If the source cell was an E-UTRA cell, this field contain the source cell EUTRA-PhysCellId with the MSB padded with a binary '0'.<br>reestablishmentCause<br>Indicates the failure cause that triggered the re-establishment procedure. gNB is not expected to reject a RRCReestablishmentRequest due to unknown cause value being used by the UE.<br>ue-Identity<br>UE identity included to retrieve UE context and to facilitate contention resolution by lower layers. |

The UE shall set the contents of RRCReestablishmentRequest message as follows:

1> set the ue-Identity as follows:
  2> if the UE was connected to an NR cell prior to the failure:
    3> set the c-RNTI to the C-RNTI used in the source PCell (reconfiguration with sync or mobility from NR failure) or used in the PCell in which the trigger for the re-establishment occurred (other cases);
    3> set the physCellId to the physical cell identity of the source PCell (reconfiguration with sync or mobility from NR failure) or of the PCell in which the trigger for the re-establishment occurred (other cases);
  2> else (if the UE was connected to an E-UTRA cell prior to the failure):
    3> set the c-RNTI to the C-RNTI used in the source E-UTRA PCell (handover or mobility from E-UTRA failure) or used in the E-UTRA PCell in which the trigger for the re-establishment occurred (other cases);
    3> set the physCellId to the physical cell identity of the source E-UTRA PCell (handover sync or mobility from E-UTRA failure) or of the PCell in 3.3. Some Second Exemplifying Embodiments: Create a New Inter-RAT Reestablishment Request Message In some embodiments, a new inter-RAT RRC Reestablishment Request message is introduced in both LTE and NR specifications (or in general terms in each potential target RAT). This message is used by the UE if it was attempting to reestablish the connection in a different RAT than it experienced failure in. As the reestablishment request message is transmitted in event of failure, the UE is likely experiencing poor radio conditions. Since the likelihood of successful transmission of the message is affected by the size of the message, i.e. a larger message requires transmitting more information which may fail and may require more retransmissions, the size of the Reestablishment Request message should not be extended.

3.3.1. Create a New Inter-RAT Reestablishment Request Message in LTE (Problem 1)

In LTE the current RRCConnectionReestablishmentRequest message is defined as:

RRCConnectionReestablishmentRequest

The RRCConnectionReestablishmentRequest message is used to request the reestablishment of an RRC connection.

Signalling radio bearer: SRB0
RLC-SAP: TM
Logical channel: CCCH
Direction: UE to E-UTRAN RRCConnectionReestablishmentRequest Message

```
-- ASN1START
RRCConnectionReestablishmentRequest ::= SEQUENCE {
    criticalExtensions              CHOICE {
        rrcConnectionReestablishmentRequest-r8
                                    RRCConnectionReestablishmentRequest-r8-IEs,
        criticalExtensionsFuture    SEQUENCE { }
    }
}
RRCConnectionReestablishmentRequest-r8-IEs ::= SEQUENCE {
    ue-Identity                     ReestabUE-Identity,
    reestablishmentCause            ReestablishmentCause,
    spare                           BIT STRING (SIZE (2))
}
ReestabUE-Identity ::=              SEQUENCE {
    c-RNTI                          C-RNTI,
    physCellId                      PhysCellId,
    shortMAC-I                      ShortMAC-I
}
ReestablishmentCause ::=            ENUMERATED {
                                    reconfigurationFailure, handoverFailure,
                                    otherFailure, spare1}
-- ASN1STOP
```

The size of this message is as follows:

The criticalExtension Choice is 1 bit ue-Identity is 41 bit:

C-RNTI is 16 bit physCellID is 9 bit shortMAC-I is 16 bit

ReestablishmentCause is 2 bit

Spare bit is 2 bit

The total is 46 bit.

On top of that, the logical channel UL-CCCH is defined as:
UL-CCCH-Message

The UL-CCCH-Message class is the set of RRC messages that may be sent from the UE to the E-UTRAN on the uplink CCCH logical channel.

```
-- ASN1START
UL-CCCH-Message ::= SEQUENCE {
    message                         UL-CCCH-MessageType
}
UL-CCCH-MessageType ::= CHOICE {
    c1                              CHOICE {
        rrcConnectionReestablishmentRequest    RRCConnectionReestablishmentRequest,
        rrcConnectionRequest                   RRCConnectionRequest
    },
    messageClassExtension           CHOICE {
        c2                          CHOICE {
            rrcConnectionResumeRequest-r13     RRCConnectionResumeRequest-r13
        },
        messageClassExtensionFuture-r13 CHOICE {
            c3                      CHOICE {
                rrcEarlyDataRequest-r15         RRCEarlyDataRequest-r15,
                spare3    NULL, spare2 NULL, spare1 NULL
            },
            messageClassExtensionFuture-r15  SEQUENCE { }
        }
    }
}
-- ASN1STOP
```

To select the rrcConnectionReestablishmentRequest, the UL-CCCH-MessageType is selected to c1, and then the rrcConnectionReestablishmentRequest is selected, i.e. adding 2 bits.

Thus, the legacy RRCConnectionReestablishmentRequest message is 48 bits.

To introduce a new message to be transmitted in the same logical channel as the legacy RRCConnectionReestablishmentRequest message, the UL-CCCH-Message must be updated to e.g.:

```
-- ASN1START
UL-CCCH-Message ::= SEQUENCE {
    message                 UL-CCCH-MessageType
}
UL-CCCH-MessageType ::= CHOICE {
    c1                      CHOICE {
        rrcConnectionReestablishmentRequest     RRCConnectionReestablishmentRequest,
        rrcConnectionRequest                    RRCConnectionRequest
    },
    messageClassExtension   CHOICE {
        c2                      CHOICE {
            rrcConnectionResumeRequest-r13          RRCConnectionResumeRequest-r13
        },
        messageClassExtensionFuture-r13 CHOICE {
            c3                      CHOICE {
                rrcEarlyDataRequest-r15         RRCEarlyDataRequest-r15,
                rrcInterRAT-ReestablishmentRequest      RRCInterRAT-ReestablishmentRequest,
                spare2 NULL, spare1 NULL
            },
            messageClassExtensionFuture-r15     SEQUENCE { }
        }
    }
}
-- ASN1STOP
```

To select this RRCInterRAT-ReestablishmentRequest message in the UL-CCCH-Message, the
UL-CCCH-MessageType selects messageClassExtension (1 bit)
messageClassExtension selects messageClassExtension-Future-r13 (1 bit)
messageClassExtensionFuture-r13 selects c3 (1 bit)
c3 selects rrcInterRAT-ReestablishmentRequest (2 bits)
This selection requires 5 bits to select (since the option c3 has four options, i.e. requires 2 bits to encode).

To maintain the size of the Reestablishment Request message, the RRCInterRAT-ReestablishmentRequest message cannot exceed 43 bits. This may be defined as follows:
RRCInterRAT-ReestablishmentRequest message RRCInterRAT-ReestablishmentRequest Message

```
-- ASN1START
RRCInter-RATReestablishmentRequest ::= SEQUENCE {
    rrcInterRAT-ReestablishmentRequest-rxx      RRCInterRAT-ReestablishmentRequest-rxx-IEs,
    }
}
RRCInterRAT-ReestablishmentRequest-rxx-IEs ::= SEQUENCE {
    ue-Identity-rxx                 ReestabUE-Identity,
    interRAT-ReestablishmentCause-rxx               InterRAT-ReestablishmentCause
}
InterRAT-ReestablishmentCause ::=       ENUMERATED {
                                            reconfigurationFailure, handoverFailure}
ReestabUE-Identity ::=              SEQUENCE {
    c-RNTI                              C-RNTI,
    physCellId                          PhysCellIdNR
    shortMAC-I                          ShortMAC-I
}
3   -- ASN1STOP
```

That new message defines fields as follows: the C-RNTI (16 bit), PhysCellIdNR (10 bit), and shortMAC-I (16 bit) sum up to 42 bit, i.e. there is only one spare bit left. This may be used to indicate a single inter-RAT reestablishment cause (as shown in the example above).

Alternatively, the UL-CCCH-Message may be updated as:

```
-- ASN1START
UL-CCCH-Message ::= SEQUENCE {
    message             UL-CCCH-MessageType
}
UL-CCCH-MessageType ::= CHOICE {
    c1                  CHOICE {
        rrcConnectionReestablishmentRequest     RRCConnectionReestablishmentRequest,
        rrcConnectionRequest                    RRCConnectionRequest
    },
    messageClassExtension   CHOICE {
        c2                  CHOICE {
            rrcConnectionResumeRequest-r13      RRCConnectionResumeRequest-r13
            rrcInterRAT-ReestablishmentRequest  RRCInterRAT-ReestablishmentRequest
        },
        messageClassExtensionFuture-r13 CHOICE {
            c3                  CHOICE {
                rrcEarlyDataRequest-r15         RRCEarlyDataRequest-r15,
                spare3 NULL, spare2 NULL, spare1 NULL
            },
            messageClassExtensionFuture-r15     SEQUENCE { }
        }
    }
}
-- ASN1STOP
```

Since the IE c2 is a choice, but only one option is available, there is in fact a spare value which may be used, without affecting backwards compatibility. Using this option, the UL-CCCH-Message will only be 3 bits (instead of 5 as the example above) which allows to e.g. extend the inter-RAT reestablishment causes and still have one bit to spare:

```
-- ASN1START
RRCInter-RATReestablishmentRequest ::= SEQUENCE {
    rrcInterRAT-ReestablishmentRequest-rxx      RRCInterRAT-ReestablishmentRequest-rxx-IEs,
    }
}
RRCInterRAT-ReestablishmentRequest-rxx-IEs ::= SEQUENCE {
    ue-Identity-rxx                 ReestabUE-Identity,
    interRAT-ReestablishmentCause-rxx   InterRAT-ReestablishmentCause
    spare                           BIT STRING (SIZE(1))
}
InterRAT-ReestablishmentCause ::=       ENUMERATED {
                                            reconfigurationFailure, handoverFailure,
                                            otherFailure, spare1}
ReestabUE-Identity ::=              SEQUENCE {
    c-RNTI                          C-RNTI,
    physCellId                      PhysCellIdNR
    shortMAC-I                      ShortMAC-I
}
-- ASN1STOP
```

3.3.2. Create a New Inter-RAT Reestablishment Request Message in NR (Problem 2)

In NR the current RRCReestablishmentRequest message is defined as:

3.3.2.1.—RRCReestablishmentRequest

The RRCReestablishmentRequest message is used to request the reestablishment of an RRC connection.

Signalling radio bearer: SRB0

RLC-SAP: TM

Logical channel: CCCH

Direction: UE to Network

RRCReestablishmentRequest Message

```
-- ASN1START
-- TAG-RRCREESTABLISHMENTREQUEST-START
RRCReestablishmentRequest ::= SEQUENCE {
    rrcReestablishmentRequest       RRCReestablishmentRequest-IEs
}
RRCReestablishmentRequest-IEs ::= SEQUENCE {
    ue-Identity                     ReestabUE-Identity,
    reestablishmentCause            ReestablishmentCause,
    spare                           BIT STRING (SIZE (1))
```

```
}
ReestabUE-Identity ::=          SEQUENCE {
    c-RNTI                          RNTI-Value,
    physCellId                      PhysCellId,
    shortMAC-I                      ShortMAC-I
}
ReestablishmentCause ::=        ENUMERATED {
                                    reconfigurationFailure,
                                    handoverFailure, otherFailure,
                                    spare1}
-- TAG-RRCREESTABLISHMENTREQUEST-STOP
-- ASN1STOP
```

The size of this message is:
ue-Identity is 42 bit:
    RNTI-Value is 16 bit
    PhysCellID is 10 bit
    shortMAC-I is 16 bit
ReestablishmentCause is 2 bit
Spare is 1 bit
The total is 45 bit. Similar to LTE, the UL-CCCH channels adds a few bits to the message.

UL-CCCH-Message
The UL-CCCH-Message class is the set of 48 bit RRC messages that may be sent from the UE to the Network on the unlink CCCH logical channel.

```
-- ASN1START
-- TAG-UL-CCCH-MESSAGE-START
UL-CCCH-Message ::= SEQUENCE {
    message             UL-CCCH-MessageType
}
UL-CCCH-MessageType ::= CHOICE {
    c1                          CHOICE {
        rrcSetupRequest             RRCSetupRequest,
        rrcResumeRequest            RRCResumeRequest,
        rrcReestablishmentRequest   RRCReestablishmentRequest,
        rrcSystemInfoRequest        RRCSystemInfoRequest
    },
    messageClassExtension       SEQUENCE { }
}
-- TAG-UL-CCCH-MESSAGE-STOP
-- ASN1STOP
```

The UL-CCCH-MessageType is one bit, and the c1 choice is 2 bits (i.e. total of 3 bits).
In order to introduce a new message on the UL-CCCH, the UL-CCCH-MessageType needs to be extended:

```
-- ASN1START
-- TAG-UL-CCCH-MESSAGE-START
UL-CCCH-Message ::= SEQUENCE {
    message             UL-CCCH-MessageType
}
UL-CCCH-MessageType ::= CHOICE {
    c1                          CHOICE {
        rrcSetupRequest             RRCSetupRequest,
        rrcResumeRequest            RRCResumeRequest,
        rrcReestablishmentRequest   RRCReestablishmentRequest,
        rrcSystemInfoRequest        RRCSystemInfoRequest
    },
    messaqeClassExtension   CHOICE {
        c2                          CHOICE {
            rrcInterRAT-ReestablishmentRequest      RRCInter-RATReestablishmentRequest,
            spare NULL
        },
        messageClassExtensionFuture-rxx         SEQUENCE { }
}
-- TAG-UL-CCCH-MESSAGE-STOP
-- ASN1STOP
```

This will correspond to 3 bits:
    UL-CCCH-Message-Type is one bit
    messageClassExtension is one bit
    c2 is one bit
    RRCInterRAT-ReestablishmentRequest message
The RRC inter-RAT Reestablishment request message may be defined as:

RRCInterRAT-ReestablishmentRequest Message

```
-- ASN1START
-- TAG-RRCINTERRATREESTABLISHMENTREQUEST-START
RRCInterRAT-ReestablishmentRequest ::= SEQUENCE {
    rrcInterRAT-ReestablishmentRequest      RRCInterRAT-ReestablishmentRequest-IEs
}
RRCInterRAT-ReestablishmentRequest-IEs ::= SEQUENCE {
    ue-Identity                 ReestabUE-Identity,
    reestablishmentCause        ReestablishmentCause,
    spare                       BIT STRING (SIZE (2))
}
```

```
ReestabUE-Identity ::=            SEQUENCE {
    c-RNTI-rxx                        EUTRA-C-RNTI-Value,
    physCellId-rxx                    EUTRA-PhysCellId,
    shortMAC-I-rxx                    ShortMAC-I
}
ReestablishmentCause ::=           ENUMERATED {
                                      reconfigurationFailure, handoverFailure,
otherFailure, spare1}
-- TAG-RRCINTERRATREESTABLISHMENTREQUEST-STOP
-- ASN1STOP
```

| RRCReestablishmentRequest field descriptions |
|---|
| c-RNTI<br>The C-RNTI value of the E-UTRA PCell the UE was connected to prior to the failure<br>physCellId<br>The Physical Cell Identity of the E-UTRA PCell the UE was connected to prior to the failure.<br>reestablishmentCause<br>Indicates the failure cause that triggered the re-establishment procedure. gNB is not expected to reject a RRCReestablishmentRequest due to unknown cause value being used by the UE.<br>ue-Identity<br>UE identity included to retrieve UE context and to facilitate contention resolution by lower layers. |

EUTRA-C-RNTI-Value
The EUTRA-C-RNTI-Value IE represents a E-UTRA Radio Network Temporary Identity.

EUTRA-C-RNTI-Value Information Element

```
-- ASN1START
-- TAG-EUTRA-C-RNTI-VALUE-START
EUTRA-C-RNTI-Value ::=         BIT STRING(SIZE(16))
-- TAG-EUTRA-C-RNTI-VALUE-STOP
-- ASN1STOP
```

Since the inter-RAT reestablishment Request message would have the same CCCH overhead as the normal RRC Reestablishment Request message, the content of the message may be of the same size.
However, since the E-UTRA PCI is 9 bits (compared to the NR PCI which is 10 bits), the inter-RAT Reestablishmen-tRequest message may have one more spare bit, or this spare bit may be used for some other purpose (e.g. extended reestablishment request causes).

3.4 Some Third Exemplifying Embodiments. Create New Reestablishment Request Message Used for Both Intra and Inter-RAT Reestablishment Similar to some second exemplifying embodiments, a new IE may be introduced which would be used for both inter-RAT and intra-RAT reestablishment.

3.4.1. Introduce a New IE in LTE for Intra and Inter-RAT Reestablishment (Problem 1)

Similar to some second exemplifying embodiments for introducing a new message in LTE, the new message would either be 43 bits or 45 bits, depending on how the UL-CCCH-Message is defined.

43 bit RRCConnectionReestablishmentRequest1 message

RRCConnectionReestablishmentRequest1 Message

```
-- ASN1START
RRCConnectionReestablishmentRequest1 ::= SEQUENCE {
    rrcConnectionReestablishmentRequest1     RRCConnectionReestablishmentRequest1-IEs,
    }
}
RRCConnectionReestablishmentRequest1-IEs ::= SEQUENCE {
    ue-Identity-rxx                          ReestabUE-Identity,
    ReestablishmentCause-rxx                 ReestablishmentCause
}
ReestablishmentCause ::=    ENUMERATED {
                                         reconfigurationFailure, handoverFailure}
ReestabUE-Identity ::=          SEQUENCE {
    c-RNTI                          C-RNTI,
    physCellId                      PhysCellId
    shortMAC-I                      ShortMAC-I
}
-- ASN1STOP
```

| RRCConnectionReestablishmentRequest field descriptions |
| --- |
| c-RNTI<br>The C-RNTI of the PCell the UE was connected to prior to the failure. If the cell was an NR cell, this field contain the RNTI-Value of the PCell the UE was connected to prior to the failue<br>physCellId<br>The Physical Cell Identity of the PCell the UE was connected to prior to the failure. If the previous PCell cell<br>was an NR cell, this field contain the PhysCellIdNR of the PCell. If the previous PCell was an E-UTRA cell,<br>this contain the PhysCellId of the Pcell with the MSB set to 0.<br>reestablishmentCause<br>Indicates the failure cause that triggered the re-establishment procedure. eNB is not expected to reject a RRCConnectionReestablishmentRequest due to unknown cause value being used by the UE.<br>ue-Identity<br>UE identity included to retrieve UE context and to facilitate contention resolution by lower layers. |

If the new Reestablishment Request message may be 45 bits instead (using the other design of the UL-CCCH-Message in some second exemplifying embodiments), the new message may instead be defined as:

45 bit RRCConnectionReestablishmentRequest1 message

RRCConnectionReestablishmentRequest1 Message

```
-- ASN1START
RRCConnectionReestablishmentRequest1 ::= SEQUENCE {
    rrcConnectionReestablishmentRequest1       RRCConnectionReestablishmentRequest1-IEs,
    }
}
RRCConnectionReestablishmentRequest-rxx-IEs ::= SEQUENCE {
    ue-Identity-rxx                            CHOICE {
        eutra-UE-Identity                      EUTRA-ReestabUE-Identity,
        nr-UE-Identity                         NR-ReestabUE-Identity,
    },
    ReestablishmentCause-rxx                   ReestablishmentCause
}
ReestablishmentCause ::=    ENUMERATED {
                                           reconfigurationFailure, handoverFailure,
                                           otherFailure, spare1}
EUTRA-ReestabUE-Identity ::=               SEQUENCE {
    c-RNTI-rxx                             C-RNTI,
    physCellId-rxx                         PhysCellId
    shortMAC-I-rxx                         ShortMAC-I
    spare                                  BIT STRING(SIZE(1))
}
ReestabUE-Identity ::=                     SEQUENCE {
    nr-C-RNTI                              RNTI-Value,
    nrPhysCellId                           PhysCellIdNR
    nrShortMAC-I                           ShortMAC-I
}
-- ASN1STOP
```

| RRCConnectionReestablishmentRequest field descriptions |
| --- |
| c-RNTI<br>The C-RNTI of the E-UTRA PCell the UE was connected to prior to the failure<br>nr-C-RNTI<br>The RNTI-Value as defined in TS 38.331 of the NR PCell the UE was connected to prior to the failure<br>nrPhysCellId<br>The Physical Cell Identity of the NR PCell the UE was connected to prior to the failure<br>physCellId<br>The Physical Cell Identity of the PCell the UE was connected to prior to the failure.<br>reestablishmentCause<br>Indicates the failure cause that triggered the re-establishment procedure. eNB is not expected to reject a RRCConnectionReestablishmentRequest due to unknown cause value being used by the UE.<br>ue-Identity<br>UE identity included to retrieve UE context and to facilitate contention resolution by lower layers from either<br>an NR or E-UTRA cell. |

Since the E-UTRA PCI is one bit shorter than the NR PCI, the choice of E-UTRA in the ue-Identity will contain one spare bit.

3.4.2. Extend Existing IE in LTE for Intra and Inter-RAT Reestablishment (Problem 1)

An alternative solution would be to extend the existing RRCConnectionReestablishmentRequest message to allow both intra- and inter-RAT reestablishments. This could e.g. be done by using the spare values:

RRCConnectionReestablishmentRequest

The RRCConnectionReestablishmentRequest message is used to request the reestablishment of an RRC connection.
Signalling radio bearer: SRB0
RLC-SAP: TM
Logical channel: CCCH
Direction: UE to E-UTRAN RRCConnectionReestablishmentRequest Message

```
-- ASN1START
RRCConnectionReestablishmentRequest ::= SEQUENCE {
    criticalExtensions              CHOICE {
        rrcConnectionReestablishmentRequest-r8
                                    RRCConnectionReestablishmentRequest-r8-IEs,
        criticalExtensionsFuture    SEQUENCE { }
    }
}
RRCConnectionReestablishmentRequest-r8-IEs ::= SEQUENCE {
    ue-Identity                     ReestabUE-Identity,
    reestablishmentCause            ReestablishmentCause,
    nrPhysCellIdMSB                 BIT STRING (SIZE (1))   OPTIONAL
}
ReestabUE-Identity ::=              SEQUENCE {
    c-RNTI                          C-RNTI,
    physCellId                      PhysCellId,
    shortMAC-I                      ShortMAC-I
}
ReestablishmentCause ::=            ENUMERATED {
                                    reconfigurationFailure, handoverFailure,
                                    otherFailure, spare1}
-- ASN1STOP
```

RRCConnectionReestablishmentRequest field descriptions c-RNTI
The C-RNTI of the PCell the UE was connected to prior to the failure. If the previous PCell was an NR cell,
this field contain the RNTI-Value as defined in TS 38.331 of the NR PCell the UE was connected to prior to the failure.
nrPhysCellIdMSB
This field contain the Most Significant Bit (MSB) of the PhysCellIdNR of the PCell the UE was connected to
prior to the failure. This field is not included if the UE was connected to a E-UTRA cell prior to the failure.
physCellId
The Physical Cell Identity of the PCell the UE was connected to prior to the failure. If the UE was connected to an NR cell prior to the failure, this field contain the 9 Least Significant Bits (LSB) of the PhysCellIdNR of the PCell the UE was connected to prior to the failure.
reestablishmentCause
Indicates the failure cause that triggered the re-establishment procedure. eNB is not expected to reject a RRCConnectionReestablishmentRequest due to unknown cause value being used by the UE.
ue-Identity
UE identity included to retrieve UE context and to facilitate contention resolution by lower layers from either
an NR or E-UTRA cell.

As the NR PCI is one bit larger than the E-UTRA PCI, the additional bit must be signaled elsewhere, e.g. by using one of the spare bits. However, since the bit should only be included if the reestablishment is from NR, one more bit is needed to signal if this field should be included or not. Another solution is to use the criticalExtensionFuture:

RRCConnectionReestablishmentRequest Message

```
-- ASN1START
RRCConnectionReestablishmentRequest ::= SEQUENCE {
    criticalExtensions              CHOICE {
        rrcConnectionReestablishmentRequest-r8
```

```
                                RRCConnectionReestablishmentRequest-r8-IEs,
        rrcConnectionReestablishmentRequest-rxx
                                RRCConnectionReestablishmentRequest-rxx-IEs,
    }
}
RRCConnectionReestablishmentRequest-r8-IEs ::= SEQUENCE {
    ue-Identity                 ReestabUE-Identity,
    reestablishmentCause        ReestablishmentCause,
    spare                       BIT STRING (SIZE (2))
}
RRCConnectionReestablishmentRequest-rxx-IEs ::= SEQUENCE {
    nr-UE-Identity-rxx          NR-ReestabUE-Identity,
    reestablishmentCause-rxx    ReestablishmentCause,
    spare                       BIT STRING (SIZE(1))
}
ReestabUE-Identity ::=          SEQUENCE {
    c-RNTI                      C-RNTI,
    physCellId                  PhysCellId,
    shortMAC-I                  ShortMAC-I
NR-ReestabUE-Identity-rxx ::=   SEQUENCE {
    nr-C-RNTI                   BIT STRING(SIZE(16)),
    nrPhysCellId                PhysCellIdNR,
    nrShortMAC-I                ShortMAC-I
}
ReestablishmentCause ::=        ENUMERATED {
                                reconfigurationFailure, handoverFailure,
                                otherFailure, spare1}
-- ASN1STOP
```

| RRCConnectionReestablishmentRequest field descriptions |
|---|
| c-RNTI<br>The C-RNTI of the PCell the UE was connected to prior to the failure.<br>nr-C-RNTI<br>The RNTI-Value as defined in TS 38.331 of the NR PCell the UE was connected to prior to the failure.<br>nrPhysCellId<br>This field contain the PhysCellIdNR of the PCell the UE was connected to prior to the failure.<br>nr-UE-Identity<br>UE identity included to retrieve UE context from previous NR cell and to facilitate contention resolution by lower layers.<br>physCellId<br>The Physical Cell Identity of the PCell the UE was connected to prior to the failure.<br>reestablishmentCause<br>Indicates the failure cause that triggered the re-establishment procedure. eNB is not expected to reject a RRCConnectionReestablishmentRequest due to unknown cause value being used by the UE.<br>ue-Identity<br>UE identity included to retrieve UE context and to facilitate contention resolution by lower layers |

3.4.3. Introduce a New IE in NR for Intra and Inter-RAT Reestablishment (Problem 2)

If a new message is introduced in NR, the UL-CCCH-Message need to be extended to enable this:

```
-- ASN1START
-- TAG-UL-CCCH-MESSAGE-START
UL-CCCH-Message ::= SEQUENCE {
    message                 UL-CCCH-MessageType
}
UL-CCCH-MessageType ::= CHOICE {
    c1                      CHOICE {
        rrcSetupRequest             RRCSetupRequest,
        rrcResumeRequest            RRCResumeRequest,
        rrcReestablishmentRequest   RRCReestablishmentRequest,
        rrcSystemInfoRequest        RRCSystemInfoRequest
    },
    messageClassExtension   CHOICE {
        c2                      CHOICE {
            rrcReestablishmentRequest1  RRCReestablishmentRequest1,
            spare NULL
```

```
        },
            messageClassExtensionFuture-rxx        SEQUENCE { }
}
-- TAG-UL-CCCH-MESSAGE-STOP
-- ASN1STOP
```

This will correspond to 3 bits:
   UL-CCCH-Message-Type is one bit
   messageClassExtension is one bit
   c2 is one bit
   RRCReestablishmentRequest1 message
The new RRC intra and inter-RAT Reestablishment request message may be defined as:

RRCReestablishmentRequest1 Message

```
-- ASN1START
-- TAG-RRCREESTABLISHMENTREQUEST1-START
RRCReestablishmentRequest ::= SEQUENCE {
        rrcReestablishmentRequest1      RRCReestablishmentRequest1-IEs
}
RRCInterRAT-ReestablishmentRequest-IEs ::= SEQUENCE {
    ue-Identity                 CHOICE {
        nr-UE-Identity              NR-ReestabUE-Identity,
        eutra-UE-Identity           EUTRA-ReestabUE-Identity,
    },
    reestablishmentCause        ReestablishmentCause,
}
NR-ReestabUE-Identity ::=       SEQUENCE {
    c-RNTI-rxx                      RNTI-Value,
    physCellId-rxx                  PhysCellId,
    shortMAC-I-rxx                  ShortMAC-I
}
EUTRA-ReestabUE-Identity ::=    SEQUENCE {
    c-RNTI-rxx                      EUTRA-C-RNTI-Value,
    physCellId-rxx                  EUTRA-PhysCellId,
    shortMAC-I-rxx                  ShortMAC-I,
    spare                           BIT STRING(SIZE(1))
}
ReestablishmentCause ::=        ENUMERATED {
                                    reconfigurationFailure,
handoverFailure,otherFailure, spare1}
-- TAG-RRCREESTABLISHMENTREQUEST1-STOP
-- ASN1STOP
```

Since the E-UTRA PCI is one bit smaller than the NR PCI, there will be a spare value in the EUTRA-ReestabUE-Identity.

Alternatively, the option c2 in the MessageClassExtension in the UL-CCCH-Message may be changed from a CHOICE to a SEQUENCE, which would allow to introduce a spare value anywhere in the RRCReestablishmentRequest1 message.

3.4.4 Extend Existing IE in NR for Intra and Inter-RAT Reestablishment (Problem 2)

An alternative solution would be to extend the existing RRCReestablishmentRequest message as:
   RRCReestablishmentRequest message

RRCReestablishmentRequest Message

```
-- ASN1START
-- TAG-RRCREESTABLISHMENTREQUEST-START
RRCReestablishmentRequest ::= SEQUENCE {
    rrcReestablishmentRequest       RRCReestablishmentRequest-IEs
}
```

```
RRCReestablishmentRequest-IEs ::= SEQUENCE {
    ue-Identity                 ReestabUE-Identity,
    reestablishmentCause        ReestablishmentCause,
    intraNR-Reestablishment     BOOLEAN
}
ReestabUE-Identity ::=          SEQUENCE {
    c-RNTI                          RNTI-Value,
    physCellId                      PhysCellId,
    shortMAC-I                      ShortMAC-I
}
ReestablishmentCause ::=        ENUMERATED {
                                    reconfigurationFailure,
handoverFailure, otherFailure, spare1}
-- TAG-RRCREESTABLISHMENTREQUEST-STOP
-- ASN1STOP
```

| RRCReestablishmentRequest field descriptions |
|---|
| c-RNTI |
| The C-RNTI of the PCell the UE was connected to prior to the failure. If the previous PCell was an E-UTRA cell, this field contain the C-RNTI-Value as defined in TS 36.331 of the E-UTRA PCell the UE was connected to prior to the failure. |
| intraNR-Reestablishment |
| True indicates whether the was connected to an NR cell prior to the failure. False indicates that the UE was connected to an E-UTRA cell prior to the failure. |
| physCellId |
| The Physical Cell Identity of the PCell the UE was connected to prior to the failure. If the previous PCell was an E-UTRA cell (intraNR-Reestablishment set to false), the 9 LSB of this field contain the EUTRA-PhysCellId of the E-UTRA PCell the UE was connected to prior to the failure and the MSB is set to a binary '0'. |
| reestablishmentCause |
| Indicates the failure cause that triggered the re-establishment procedure. gNB is not expected to reject a RRCReestablishmentRequest due to unknown cause value being used by the UE. |
| ue-Identity |
| UE identity included to retrieve UE context and to facilitate contention resolution by lower layers. |

3.5 Some Fourth Exemplifying Embodiments: Extend Existing IE to Include Dummy Variables in Case of Inter-RAT Reestablishment (Problem 1 and 2)

As the main problem solved by some embodiments is the conversion of parameters from a first RAT to a second RAT, the parameters may be replaced by dummy values. In particular, the physical cell identities have different number of values (504 in LTE and 1008 in NR) which are coded as 9 or 10 bits respectively.

As the possible range of physical cell identities is smaller than the number of values which may be configured in the parameter PhysCellId, there are a number of unused values, i.e. the value 504 to 511 in LTE and 1008 to 1023 in NR. These values may be used instead of the source PCI when attempting to reestablish in a different RAT than the one in which the UE experienced the failure.

In order for the network to be able to locate the UE context once the reestablishment request message have been received, the network must identify the cell the UE was connected to prior to the failure. In normal reestablishment, this is done using the source PCI (and possibly additional information available at the network side such as a neighbour relation mapping the PCI to a unique node identifier), but since this value is replaced with a dummy value, this information is lost.

In one solution, the target node (where the UE attempts the reestablishment) queries all neighboring inter-RAT nodes to see if any of them may locate the UE context based on the C-RNTI and shortMAC-I. This could result in significant signaling overhead.

In another solution, the UE computes the extraneous PhysCellId value using an algorithm, e.g. the modulus operation: mod(sourcePCI,8) in LTE and mod(source-PCI, 16) in NR. i.e. the UE assigns a range of the source PCI to each of the spare values in the PhysCellId.

For reestablishment in NR, this means that each spare value corresponds to approximately 32 different E-UTRA PC's (508 PCI values/16 spare values).

For reestablishment in LTE, this means that each spare value corresponds to 126 different NR PC's (1008 PCI values/8 spare values).

This will reduce the likelihood of ambiguity but will potentially still require query of multiple neighboring inter-RAT cells, although not as many as without this solution.

Naturally, any other predefined function to map the source PC's to the spare values may be used, alternatively, the UE may be instructed through either dedicated signaling when in RRC_CONNECTED or through broadcasted signaling which method should be used to map the PC's to the spare values.

In yet another solution, the target node in target RAT only tries to re-establish if the source cell in the source RAT is in the same node. Otherwise, the target node performs a fallback operation and responds the RRC reestablishment request kind of message with an RRC Connection Setup (i.e. as if the UE would be coming from RRC_IDLE) so the AS context may be setup from the beginning.

3.6 Some Fifth Exemplifying Embodiments: UE is Provided with Inter-RAT Parameters Prior to the Failure (Problem 1 and 2)

In some embodiments, the UE has prior to re-establishment both inter-RAT and intra-RAT identities to be used in case of a re-establishment. Examples of the identities are the C-RNTI and PCI.

In prior art, an RRC_CONNECTED UE always assume a cell as its PCell and has at least one C-RNTI assigned to it. In this embodiment, as the UE has an inter-RAT identifier prior to re-establish the connection in a second RAT (different from the one the connection has failed), the UE is assigned by the network with an inter-RAT C-RNTI (i.e. a C-RNTI in the format of a target RAT that may potentially be selected for re-establishment). That may be assigned via dedicated signaling e.g. during connection setup, connection establishment, handovers, reconfiguration with sync, resume, release, suspend, etc. In one variant, that assigned is implicit e.g. network indicates in a flag that same C-RNTI of the source RAT should be used in the re-establishment request message. The absence of an inter-RAT C-RNTI may also be used to indicate that the UE shall use the source RAT C-RNTI in the re-establishment request message.

The UE is assigned with an inter-RAT PCI prior to send a re-establishment request message in the second RAT. That may be assigned via dedicated signalling e.g. during connection setup, connection establishment, handovers, reconfiguration with sync, resume, release, suspend, etc. In one variant, that assigned is implicit e.g. network indicates in a flag that same PCI of the source cell in the source RAT should be used in the re-establishment request message. The absence of an inter-RAT PCI may also be used to indicate that the UE shall use the source RAT PCI in the re-establishment request message. In another variant, the UE is assigned with the inter-RAT PCI by reading system information. In other words, a cell of a first RAT broadcasts in addition to its own cell identifier(s) (e.g., PCI and cell Identity) additional cell identifier(s) in a different format, such as in the format of a second RAT, so that it is used by the UE in case the UE re-establishes in the second RAT after coming from the first RAT.

For the PCI, the length of the parameters differs in LTE and NR. The UE calculates the PCI based on the broadcasted Primary Synchronization Signal (PSS) and the Secondary Synchronization Signal (SSS). In addition to this source PCI obtained from the PSS/SSS, the UE may be provided with a second physical cell identity in the format of the second RAT, i.e. if the UE is connected to and NR cell, the UE obtains a EUTRA-PhysCellId associated with the source NR cell. This could either be provided in a RRCReconfigurationMessage, or be broadcasted in one of the SystemInformationBlockType (SIB) Messages.

Similarly, if the UE is connected to an E-UTRA cell, the UE obtains a 9 bit E-UTRA PhysCellId from the PSS/SSS and may be provided with a second 10 bit PhysCellIdNR associated with the source PCell either through dedicated signaling (e.g. the RRCConnectionReconfiguration message) or broadcasted in one of the SIBs.

If the UE attempts to reestablish the connection in a different RAT than it was previously connected to, it uses the parameters in the format of the target RAT, i.e. if the UE was connected to an NR PCell prior to the failure and attempts to reestablish in an E-UTRA cell, the UE includes the EUTRA-PhysCellId it received from the source cell. Similarly if the UE was connected to an E-UTRA cell prior to the failure and attempt to reestablish in an NR cell, the UE uses the PhysCellIdNR it received from the source PCell.

Resolving Potential Ambiguities for Inter-RAT and Intra-RAT Cases

In some of the previous solutions, it is assumed a single RRC Reestablishment Request message with a defined UE identifier comprised by a source cell PCI and a source cell C-RNTI. In the solutions with this single message, it may be ambiguous to the network whether this is an inter-RAT or intra-RAT re-establishment as the same information may be valid for the same RAT or for a different RAT. To resolve that, an indication may be added in the request message (either implicit or explicit) so network is able to distinguish inter-RAT from intra-RAT requests. That is especially relevant in the Further Extensions and Variations With reference to FIG. 9, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 112, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 20 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
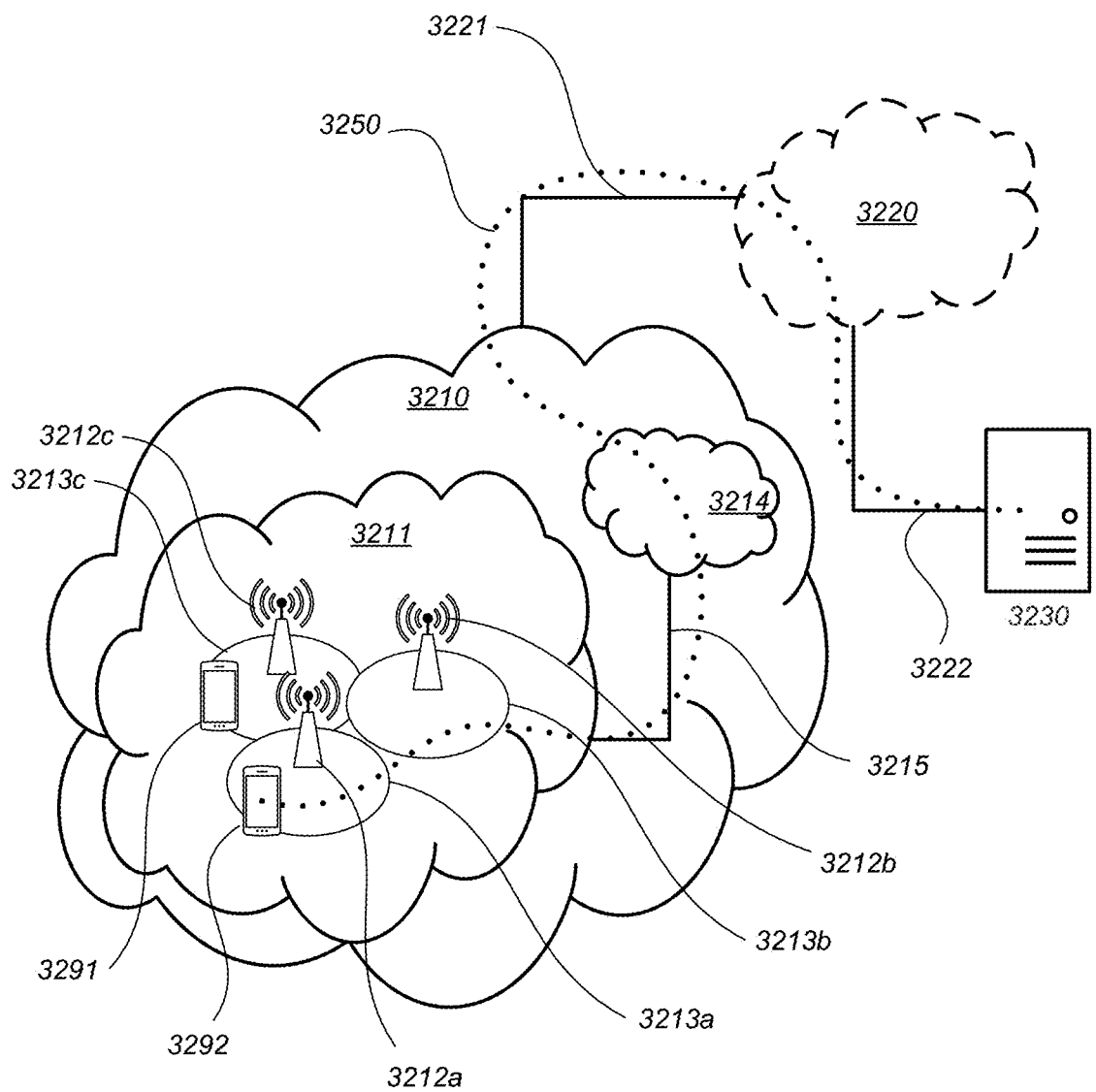
FIG. 9 schematically illustrates a telecommunication network connected via an intermediate network to a host computer.
Figure 10:
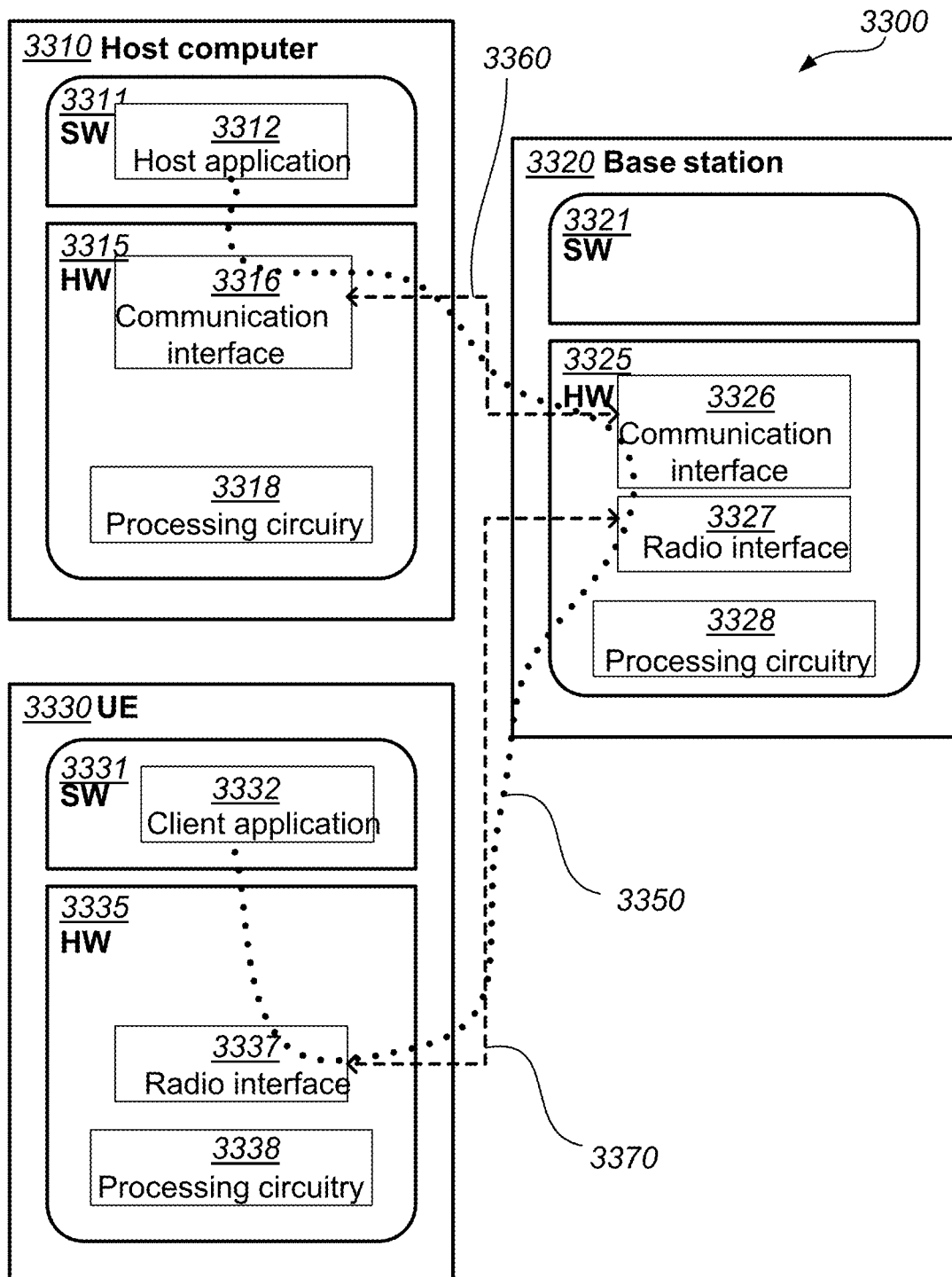
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212*a*, 3212*b*, 3212*c* and one of the UEs 3291, 3292 of FIG. 9, respectively. This is to say, the inner workings of these entities may be as shown in FIG. 10 and independently, the surrounding network topology may be that of FIG. 18.

In FIG. 19, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the pSIM scheduling allowing more positioning assistance data to be broadcasted.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
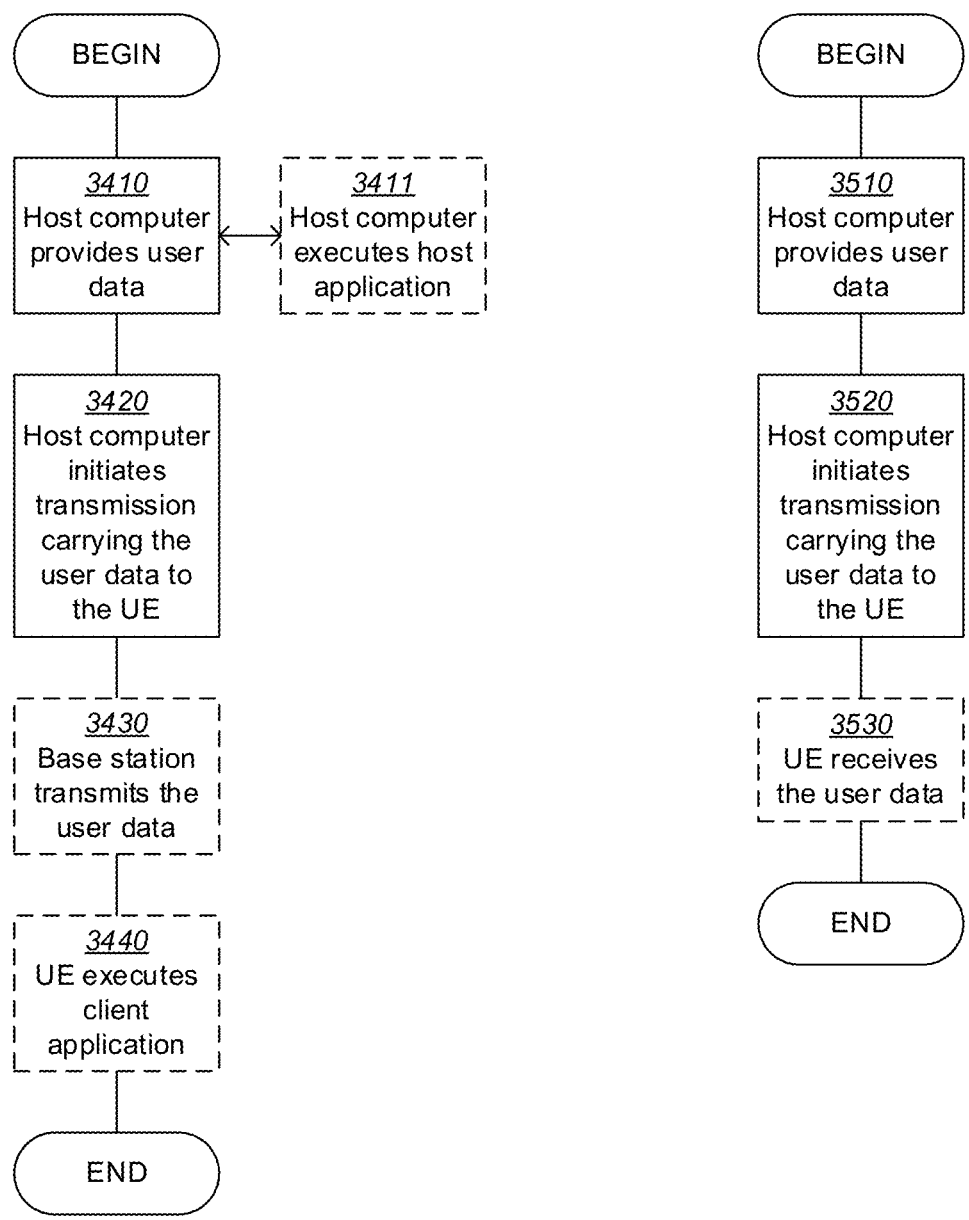

FIGS. 9 and 10 and the corresponding text are about a downstream aspect of the radio-related invention, while FIGS. 11 and 12 and the corresponding text discuss an upstream aspect.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 9 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS.

9 and 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| MAC-I | Message Authentication Code - Integrity |
| RRC | Radio Resource Control |
| NG-RAN | Next Generation Radio Access Network |
| RNTI | Radio Network Temporary Identifier |
| C-RNTI | Cell RNTI |
| I-RNTI | Inactive RNTI |

-continued

| Abbreviation | Explanation |
| --- | --- |
| NR | New Radio (5G) |
| LTE | Long Term Evolution (4G) |
| EPC | Evolved Packet Core |
| EPS | Evolved Packet System |
| 5GC | 5G Core |
| 5GS | 5G System |
| PDCP | Packet Data Convergence Protocol |
| PCI | Physical Cell Identity |
| NAS | Non Access Stratum |
| NIA | NR Integrity Protection Algorithm |
| EIA | E-UTRA Integrity Protection Algorithm |
| E-UTRA | Evolved Universal Terrestrial Radio Access |
| RAT | Radio Access Technology |

The invention claimed is:

1. A method performed by a wireless device for re-establishing a radio connection in a wireless communications network comprising a first Radio Access Technology, RAT, and a second RAT being different from the first RAT, wherein the wireless device is operating in a first cell served by a first radio network node operating in the first RAT, and wherein the method comprises:
when a connection failure with the first cell served by the first radio network node is detected,
performing a cell selection;
selecting a second cell served by a second radio network node operating in the second RAT, which second cell is known by the wireless device to be a candidate for re-establishment;
determining a first set of parameters to be used as an identifier of the wireless device, wherein the first set of parameters is associated with the first cell;
updating the first set of parameters by converting one or more parameters of the first set of parameters to a format of a message for the second RAT; and
transmitting to the second cell, a re-establishment request message comprising the first set of parameters as the identifier of the wireless device.

2. The method of claim 1, wherein the converting of the first set of parameters comprises:
one or more out of:
mapping, recalculating, truncating the one or more parameters of the first set of parameters to a shortened bit string when the first RAT is 5G New Radio, NR, technology and the second RAT is a Long Term Evolution, LTE, technology, and
mapping, recalculating, or padding the one or more parameters of the first set of parameters to an extended bit string when the first RAT is LTE and the second RAT is NR; and
using the converted one or more parameters of the first set of parameters in one or more variables defined in the second RAT as the identifier of the wireless device in the re-establishment message.

3. The method of claim 1, wherein the transmitting of the re-establishment request message comprises:
transmitting the first set of parameters to the second radio network node in an inter-RAT re-establishment request message, which inter-RAT re-establishment request message allows the first set of parameters in a format of the first RAT to be transmitted in the second RAT during re-establishment.

4. The method of claim 1, wherein the transmitting of the re-establishment request message comprises:

transmitting the first set of parameters to the second radio network node in an inter-RAT re-establishment request message, which inter-RAT re-establishment request message comprises one or more new inter-RAT re-establishment information elements to allow both a first RAT format and a second RAT format for the identifier of the wireless device in the first and the second RAT, respectively.

5. The method of claim 1, wherein the wireless device in the first RAT is provided with an inter-RAT identifier in a format of at least one target cell in the second RAT for re-establishment, and wherein the transmitting of the re-establishment request message comprises:

transmitting the inter-RAT identifier as the identifier of the wireless device in the re-establishment request message to the second radio network node.

6. The method of claim 1, further comprising:

providing an additional identifier in the re-establishment request message, wherein the additional identifier indicates whether the re-establishment request message is an inter-RAT re-establishment request message or an intra-RAT re-establishment request message.

7. A method performed by a second radio network node for assisting a wireless device in re-establishing a radio connection in a wireless communications network comprising a first Radio Access Technology, RAT, and a second RAT being different from the first RAT, wherein the wireless device operates in a first cell served by a first radio network node operating in the first RAT, wherein the second radio network node operates in the second RAT, and wherein the method comprises:

providing the wireless device with an instruction how to convert one or more parameters of a first set of parameters associated with the first cell into a format corresponding to the format of the second RAT or how to convert the one or more parameters of the second set of parameters into a format corresponding to the format of the first RAT;

receiving a re-establishment request message comprising an identifier of the wireless device transmitting the re-establishment request message when a failure of a radio connection with the first radio network node is detected;

determining the first radio network node based on the identifier;

transmitting the identifier to the first radio network node;

receiving, from the first radio network node, one or more configurations and/or parameters relating to the radio connection to be re-established; and re-establishing the connection with the wireless device based on the one or more configurations and/or parameters.

8. A wireless device for re-establishing a radio connection in a wireless communications network comprising a first Radio Access Technology, RAT, and a second RAT being different from the first RAT, wherein the wireless device is configured to operate in a first cell served by a first radio network node configured to operate in the first RAT, and wherein the wireless device, when a connection failure with the first cell served by the first radio network node is detected, is configured to:

perform a cell selection;

select a second cell served by a second radio network node operating in the second RAT, which second cell is known by the wireless device to be a candidate for re-establishment;

determine a first set of parameters to be used as an identifier of the wireless device, wherein the first set of parameters is associated with the first cell;

update the first set of parameters by converting the one or more parameters of the first set of parameters to a format of a message for the second RAT; and transmit to the second cell, a re-establishment request message comprising the first set of parameters as the identifier of the wireless device.

9. The wireless device of claim 8, wherein the wireless device is configured to update the first set of parameters to have a format corresponding to the format of the second RAT by being configured to:

convert the one or more parameters of the first set of parameters to a format of a message for the second RAT by performing one or more out of:

mapping, recalculating or truncating the one or more parameters of the first set of parameters to a shortened bit string when the first RAT is 5G New Radio, NR, technology and the second RAT is a Long Term Evolution, LTE, technology, and mapping, recalculating or padding the one or more parameters of the first set of parameters to an extended bit string when the first RAT is LTE and the second RAT is NR; and wherein the wireless device is configured to:

use the converted one or more parameters of the first set of parameters in one or more variables defined in the second RAT as the identifier of the wireless device in the re-establishment message.

10. The wireless device of claim 8, wherein the wireless device is configured to transmit the re-establishment request message by further being configured to:

transmit the first set of parameters to the second radio network node in an inter-RAT re-establishment request message, which inter-RAT re-establishment request message allows the first set of parameters in a format of the first RAT to be transmitted in the second RAT during re-establishment.

11. The wireless device of claim 8, wherein the wireless device is configured to transmit the re-establishment request message by further being configured to:

transmit the first set of parameters to the second radio network node in an inter-RAT re-establishment request message, which inter-RAT re-establishment request message comprises one or more new inter-RAT re-establishment information elements to allow both a first RAT format and a second RAT format for the identifier of the wireless device in the first and the second RAT, respectively.

12. The wireless device of claim 8, wherein the wireless device in the first RAT is provided with an inter-RAT identifier in a format of at least one target cell in the second RAT for re-establishment, and wherein the wireless device is configured to transmit the re-establishment request message by further being configured to:

transmit the inter-RAT identifier as the identifier of the wireless device in the re-establishment request message to the second radio network node.

13. The wireless device claim 8, further being configured to:

provide an additional identifier in the re-establishment request message, wherein the additional identifier indicates whether the re-establishment request message is an inter-RAT re-establishment request message or an intra-RAT re-establishment request message.

14. A second radio network node for assisting a wireless device in re-establishing a radio connection in a wireless communications network comprising a first Radio Access Technology, RAT, and a second RAT being different from the first RAT, wherein the wireless device is configured to operate in a first cell served by a first radio network node configured to operate in the first RAT, wherein the second radio network node is configured to operate in the second RAT, and wherein the radio network node is configured to:
- provide the wireless device with an instruction how to convert one or more parameters of a first set of parameters associated with the first cell into a format corresponding to the format of the second RAT or how to convert the one or more parameters of the second set of parameters into a format corresponding to the format of the first RAT;
- receive a re-establishment request message comprising an identifier of the wireless device transmitting the re-establishment request message when a failure of a radio connection with the first radio network node has been detected;
- determine the first radio network node based on the identifier;
- transmit the identifier to the first radio network node;
- receive, from the first radio network node, one or more configurations and/or parameters relating to the radio connection to be re-established; and
- re-establish the connection with the wireless device based on the one or more configurations and/or parameters.

15. A computer program, comprising instructions which, when executed on at least one processor, causes the at least one processor to carry out the method according to claim 1.

16. A carrier comprising the computer program of claim 15, wherein the carrier is one of an electronic signal, an optical signal, a radio signal, or a computer readable storage medium.

* * * * *